(12) United States Patent
Klaassen

(10) Patent No.: US 7,939,205 B2
(45) Date of Patent: May 10, 2011

(54) THIN-FILM BATTERIES WITH POLYMER AND LIPON ELECTROLYTE LAYERS AND METHOD

(75) Inventor: Jody J. Klaassen, Minneapolis, MN (US)

(73) Assignee: Cymbet Corporation, Elk River, MN (US)

( * ) Notice: Subject to any disclaimer, the term of this patent is extended or adjusted under 35 U.S.C. 154(b) by 0 days.

(21) Appl. No.: 12/850,078

(22) Filed: Aug. 4, 2010

(65) Prior Publication Data
US 2010/0316913 A1 Dec. 16, 2010

Related U.S. Application Data

(62) Division of application No. 11/458,093, filed on Jul. 17, 2006, now Pat. No. 7,776,478.

(60) Provisional application No. 60/699,895, filed on Jul. 15, 2005.

(51) Int. Cl.
*H01M 6/14* (2006.01)
*H01M 6/18* (2006.01)

(52) U.S. Cl. .................. 429/300; 429/322; 429/304

(58) Field of Classification Search ............ 429/47–347; 427/1–601; 29/623.1–625
See application file for complete search history.

(56) References Cited

U.S. PATENT DOCUMENTS

| | | | |
|---|---|---|---|
| 3,419,487 A | 12/1968 | Robbins et al. |
| 4,207,119 A | 6/1980 | Tyan |
| 4,299,890 A | 11/1981 | Rea et al. |
| 4,328,262 A | 5/1982 | Kurahashi et al. |
| 4,333,808 A | 6/1982 | Bhattacharyya et al. |
| 4,353,160 A | 10/1982 | Armini et al. |
| 4,365,107 A | 12/1982 | Yamauchi |
| 4,435,445 A | 3/1984 | Allred et al. |
| 4,440,108 A | 4/1984 | Little et al. |

(Continued)

FOREIGN PATENT DOCUMENTS

DE 19948742 12/2000

(Continued)

OTHER PUBLICATIONS

Lee, S.H. et al., "Lithium Thin-Film Battery with a Reversed Structural Configuration SS/Li/Lipon/LixV2O5/Cu," Electrochemical and Solid State Letters, vol. 6, pp. A275-A277, 2003 (Oct. 2003).

(Continued)

*Primary Examiner* — Dah-Wei D Yuan
*Assistant Examiner* — Zachary Best
(74) *Attorney, Agent, or Firm* — Kagan Binder, PLLC

(57) ABSTRACT

A method and apparatus for making thin-film batteries having composite multi-layered electrolytes with soft electrolyte between hard electrolyte covering the negative and/or positive electrode, and the resulting batteries. In some embodiments, foil-core cathode sheets each having a cathode material (e.g., $LiCoO_2$) covered by a hard electrolyte on both sides, and foil-core anode sheets having an anode material (e.g., lithium metal) covered by a hard electrolyte on both sides, are laminated using a soft (e.g., polymer gel) electrolyte sandwiched between alternating cathode and anode sheets. A hard glass-like electrolyte layer obtains a smooth hard positive-electrode lithium-metal layer upon charging, but when very thin, have randomly spaced pinholes/defects. When the hard layers are formed on both the positive and negative electrodes, one electrode's dendrite-short-causing defects on are not aligned with the other electrode's defects. The soft electrolyte layer both conducts ions across the gap between hard electrolyte layers and fills pinholes.

17 Claims, 8 Drawing Sheets

U.S. PATENT DOCUMENTS

| | | |
|---|---|---|
| 4,481,265 A | 11/1984 | Ezawa et al. |
| 4,520,039 A | 5/1985 | Ovshinsky |
| 4,539,660 A | 9/1985 | Miyauchi et al. |
| 4,633,129 A | 12/1986 | Cuomo et al. |
| 4,645,726 A | 2/1987 | Hiratani et al. |
| 4,684,848 A | 8/1987 | Kaufman et al. |
| 4,696,671 A | 9/1987 | Epstein et al. |
| 4,730,383 A | 3/1988 | Balkanski |
| 4,740,431 A | 4/1988 | Little |
| 4,756,984 A | 7/1988 | Descroix et al. |
| 4,832,463 A | 5/1989 | Goldner et al. |
| 4,862,032 A | 8/1989 | Kaufman et al. |
| 4,952,467 A | 8/1990 | Buchel et al. |
| 5,017,550 A | 5/1991 | Shioya et al. |
| 5,022,930 A | 6/1991 | Ackerman et al. |
| 5,051,274 A | 9/1991 | Goldner et al. |
| 5,061,581 A | 10/1991 | Narang et al. |
| 5,064,520 A | 11/1991 | Miyake et al. |
| 5,089,104 A | 2/1992 | Kanda et al. |
| 5,098,737 A | 3/1992 | Collins et al. |
| 5,115,378 A | 5/1992 | Tsuchiya et al. |
| 5,126,031 A | 6/1992 | Gordon et al. |
| 5,151,848 A | 9/1992 | Finello |
| 5,166,009 A | 11/1992 | Abraham et al. |
| 5,171,413 A | 12/1992 | Arntz et al. |
| 5,180,645 A | 1/1993 | More |
| 5,189,550 A | 2/1993 | Goldner et al. |
| 5,192,947 A | 3/1993 | Neustein |
| 5,202,196 A | 4/1993 | Wang et al. |
| 5,202,201 A | 4/1993 | Meunier et al. |
| 5,261,968 A | 11/1993 | Jordan |
| 5,273,837 A | 12/1993 | Aitken et al. |
| 5,296,122 A | 3/1994 | Katsube et al. |
| 5,314,765 A | 5/1994 | Bates |
| 5,338,625 A | 8/1994 | Bates et al. |
| 5,348,703 A | 9/1994 | Bishop et al. |
| 5,393,572 A | 2/1995 | Dearnaley |
| 5,411,592 A | 5/1995 | Ovshinsky et al. |
| 5,414,025 A | 5/1995 | Allcock et al. |
| 5,415,717 A | 5/1995 | Perneborn |
| 5,425,966 A | 6/1995 | Winter et al. |
| 5,426,005 A | 6/1995 | Eschbach |
| 5,426,561 A | 6/1995 | Yen et al. |
| 5,433,096 A | 7/1995 | Janssen et al. |
| 5,445,126 A | 8/1995 | Graves, Jr. |
| 5,445,906 A | 8/1995 | Hobson et al. |
| 5,448,110 A | 9/1995 | Tuttle et al. |
| 5,449,576 A | 9/1995 | Anani |
| 5,449,994 A | 9/1995 | Armand et al. |
| 5,455,126 A | 10/1995 | Bates et al. |
| 5,468,521 A | 11/1995 | Kanai et al. |
| 5,482,611 A | 1/1996 | Helmer et al. |
| 5,494,762 A | 2/1996 | Isoyama et al. |
| 5,501,175 A | 3/1996 | Tanaka et al. |
| 5,501,924 A | 3/1996 | Swierbut et al. |
| 5,503,948 A | 4/1996 | MacKay et al. |
| 5,510,209 A | 4/1996 | Abraham et al. |
| 5,512,147 A | 4/1996 | Bates et al. |
| 5,523,179 A | 6/1996 | Chu |
| 5,528,222 A | 6/1996 | Moskowitz et al. |
| 5,529,671 A | 6/1996 | Debley et al. |
| 5,536,333 A | 7/1996 | Foote et al. |
| 5,549,989 A | 8/1996 | Anani |
| 5,558,953 A | 9/1996 | Matsui et al. |
| 5,561,004 A | 10/1996 | Bates et al. |
| 5,567,210 A | 10/1996 | Bates et al. |
| 5,569,520 A | 10/1996 | Bates |
| 5,569,564 A | 10/1996 | Swierbut et al. |
| 5,571,749 A | 11/1996 | Matsuda et al. |
| 5,582,623 A | 12/1996 | Chu |
| 5,585,999 A | 12/1996 | De Long et al. |
| 5,593,551 A | 1/1997 | Lai |
| 5,597,660 A | 1/1997 | Bates et al. |
| 5,599,644 A | 2/1997 | Swierbut et al. |
| 5,601,652 A | 2/1997 | Mullin et al. |
| 5,612,152 A | 3/1997 | Bates |
| 5,626,976 A | 5/1997 | Blanton et al. |
| 5,644,207 A | 7/1997 | Lew et al. |
| 5,648,187 A | 7/1997 | Skotheim |
| 5,654,084 A | 8/1997 | Egert |
| 5,654,111 A | 8/1997 | Minomiya et al. |
| 5,686,201 A | 11/1997 | Chu |
| 5,695,873 A | 12/1997 | Kumar et al. |
| 5,695,885 A | 12/1997 | Malhi |
| 5,705,293 A | 1/1998 | Hobson |
| 5,714,404 A | 2/1998 | Mitlitsky et al. |
| 5,763,058 A | 6/1998 | Isen et al. |
| 5,789,108 A | 8/1998 | Chu |
| 5,814,420 A | 9/1998 | Chu |
| 5,830,331 A | 11/1998 | Kim et al. |
| 5,849,426 A | 12/1998 | Thomas et al. |
| 5,853,916 A | 12/1998 | Venugopal et al. |
| 5,863,337 A | 1/1999 | Neuman et al. |
| 5,868,914 A | 2/1999 | Landsbergen et al. |
| 5,872,080 A | 2/1999 | Arendt et al. |
| 5,914,507 A | 6/1999 | Polla et al. |
| 5,925,483 A | 7/1999 | Kejha et al. |
| 5,932,284 A | 8/1999 | Reynolds |
| 5,935,727 A | 8/1999 | Chiao |
| 5,953,677 A | 9/1999 | Sato |
| 5,978,207 A | 11/1999 | Anderson et al. |
| 5,981,107 A | 11/1999 | Hamano et al. |
| 5,982,284 A | 11/1999 | Baldwin et al. |
| 5,985,485 A | 11/1999 | Ovshinsky et al. |
| 5,995,006 A | 11/1999 | Walsh |
| 6,001,715 A | 12/1999 | Manka et al. |
| 6,002,208 A | 12/1999 | Maishev et al. |
| 6,017,651 A | 1/2000 | Nimon et al. |
| 6,023,610 A | 2/2000 | Wood, Jr. |
| 6,025,094 A | 2/2000 | Visco et al. |
| 6,033,471 A | 3/2000 | Nakanishi et al. |
| 6,037,717 A | 3/2000 | Maishev et al. |
| 6,042,687 A | 3/2000 | Singh et al. |
| 6,056,857 A | 5/2000 | Hunt et al. |
| 6,059,847 A | 5/2000 | Farahmandi et al. |
| 6,077,621 A | 6/2000 | Allen et al. |
| 6,078,791 A | 6/2000 | Tuttle et al. |
| 6,086,962 A | 7/2000 | Mahoney et al. |
| 6,094,292 A | 7/2000 | Goldner et al. |
| 6,103,412 A | 8/2000 | Hirano et al. |
| 6,110,620 A | 8/2000 | Singh et al. |
| 6,130,507 A | 10/2000 | Maishev et al. |
| 6,133,159 A | 10/2000 | Vaartstra et al. |
| 6,136,165 A | 10/2000 | Moslehi |
| 6,139,964 A | 10/2000 | Sathrum et al. |
| 6,147,354 A | 11/2000 | Maishev et al. |
| 6,153,067 A | 11/2000 | Maishev et al. |
| 6,163,260 A | 12/2000 | Conwell et al. |
| 6,165,644 A | 12/2000 | Nimon et al. |
| 6,168,884 B1 | 1/2001 | Neudecker et al. |
| 6,181,237 B1 | 1/2001 | Gehlot |
| 6,181,545 B1 | 1/2001 | Amatucci et al. |
| 6,203,944 B1 | 3/2001 | Turner et al. |
| 6,220,516 B1 | 4/2001 | Tuttle et al. |
| 6,222,117 B1 | 4/2001 | Shiozaki |
| 6,236,061 B1 | 5/2001 | Walpita |
| 6,238,813 B1 | 5/2001 | Maile et al. |
| 6,264,709 B1 | 7/2001 | Yoon et al. |
| 6,277,523 B1 | 8/2001 | Giron |
| 6,280,875 B1 | 8/2001 | Kwak et al. |
| 6,281,795 B1 | 8/2001 | Smith et al. |
| 6,294,722 B1 | 9/2001 | Kondo et al. |
| 6,325,294 B2 | 12/2001 | Tuttle et al. |
| 6,327,909 B1 | 12/2001 | Hung et al. |
| 6,391,664 B1 | 5/2002 | Goruganthu et al. |
| 6,395,043 B1 | 5/2002 | Shadle et al. |
| 6,399,489 B1 | 6/2002 | M'Saad et al. |
| 6,402,795 B1 | 6/2002 | Chu et al. |
| 6,402,796 B1 | 6/2002 | Johnson |
| 6,413,285 B1 | 7/2002 | Chu et al. |
| 6,413,675 B1 * | 7/2002 | Harada et al. ................. 429/300 |
| 6,432,577 B1 | 8/2002 | Shul et al. |
| 6,475,854 B2 | 11/2002 | Narwankar et al. |
| 6,558,836 B1 | 5/2003 | Whitacre et al. |
| 6,576,365 B1 | 6/2003 | Meitav et al. |
| 6,576,369 B1 | 6/2003 | Moriguchi et al. |
| 6,576,371 B1 | 6/2003 | Yasuda |

| | | |
|---|---|---|
| 6,599,580 B2 | 7/2003 | Muffoletto et al. |
| 6,608,464 B1 | 8/2003 | Lew et al. |
| 6,610,971 B1 | 8/2003 | Crabtree |
| 6,634,232 B1 | 10/2003 | Rettig et al. |
| 6,645,656 B1 | 11/2003 | Chen et al. |
| 6,723,140 B2 | 4/2004 | Chu et al. |
| 6,741,178 B1 | 5/2004 | Tuttle |
| 6,749,648 B1 | 6/2004 | Kumar et al. |
| 6,770,176 B2 | 8/2004 | Benson et al. |
| 6,805,998 B2 | 10/2004 | Jenson et al. |
| 6,818,356 B1 | 11/2004 | Bates |
| 6,821,348 B2 | 11/2004 | Baude et al. |
| 6,866,901 B2 | 3/2005 | Burrows et al. |
| 6,897,164 B2 | 5/2005 | Baude et al. |
| 6,906,436 B2 | 6/2005 | Jenson et al. |
| 6,924,164 B2 | 8/2005 | Jenson |
| 6,955,866 B2 | 10/2005 | Nimon et al. |
| 6,982,132 B1 | 1/2006 | Goldner et al. |
| 6,986,965 B2 | 1/2006 | Jenson et al. |
| 6,989,750 B2 | 1/2006 | Shanks et al. |
| 6,991,662 B2 | 1/2006 | Visco et al. |
| 7,052,805 B2 | 5/2006 | Narang et al. |
| 7,169,503 B2 | 1/2007 | Laurent et al. |
| 7,220,517 B2 | 5/2007 | Park et al. |
| 7,267,897 B2 | 9/2007 | Bloch et al. |
| 7,282,296 B2 | 10/2007 | Visco et al. |
| 7,695,531 B2 | 4/2010 | Gaillard et al. |
| 7,776,478 B2 | 8/2010 | Klaassen |
| 2001/0007335 A1 | 7/2001 | Tuttle et al. |
| 2001/0014398 A1 | 8/2001 | Veerasamy |
| 2001/0033952 A1 | 10/2001 | Jenson et al. |
| 2001/0041294 A1 | 11/2001 | Chu et al. |
| 2001/0043569 A1 | 11/2001 | Wood, Jr. |
| 2001/0051300 A1 | 12/2001 | Moriguchi et al. |
| 2002/0000034 A1 | 1/2002 | Jenson |
| 2002/0037756 A1 | 3/2002 | Jacobs et al. |
| 2002/0076616 A1 | 6/2002 | Lee et al. |
| 2002/0110733 A1 | 8/2002 | Johnson |
| 2002/0110739 A1 | 8/2002 | McEwen et al. |
| 2003/0008364 A1 | 1/2003 | Wang et al. |
| 2003/0013012 A1 | 1/2003 | Ahn et al. |
| 2003/0091904 A1 | 5/2003 | Munshi |
| 2003/0104590 A1 | 6/2003 | Santini, Jr. et al. |
| 2003/0151118 A1 | 8/2003 | Baude et al. |
| 2003/0171984 A1 | 9/2003 | Wodka et al. |
| 2003/0175585 A1 | 9/2003 | Ugaji et al. |
| 2004/0023106 A1* | 2/2004 | Benson et al. ............ 429/122 |
| 2004/0043290 A1 | 3/2004 | Hatta et al. |
| 2004/0049909 A1 | 3/2004 | Salot et al. |
| 2004/0067396 A1 | 4/2004 | Bloch et al. |
| 2004/0077383 A1 | 4/2004 | Lappetelainen et al. |
| 2004/0086781 A1 | 5/2004 | Fukuzawa et al. |
| 2004/0094949 A1 | 5/2004 | Savagian et al. |
| 2004/0131760 A1 | 7/2004 | Shakespeare |
| 2004/0131761 A1 | 7/2004 | Shakespeare |
| 2004/0131897 A1 | 7/2004 | Jenson et al. |
| 2004/0151845 A1 | 8/2004 | Munshi |
| 2004/0161640 A1 | 8/2004 | Salot et al. |
| 2004/0219434 A1 | 11/2004 | Benson et al. |
| 2005/0001214 A1 | 1/2005 | Brun et al. |
| 2005/0019635 A1 | 1/2005 | Arroyo et al. |
| 2005/0019666 A1 | 1/2005 | Yasuda |
| 2005/0042499 A1 | 2/2005 | Laurent et al. |
| 2005/0079418 A1 | 4/2005 | Kelley et al. |
| 2005/0095506 A1 | 5/2005 | Klaassen |
| 2005/0199282 A1 | 9/2005 | Oleinick et al. |
| 2006/0022829 A1 | 2/2006 | Pan |
| 2006/0154141 A1 | 7/2006 | Salot et al. |
| 2006/0191198 A1 | 8/2006 | Rosenzweig et al. |
| 2007/0012244 A1 | 1/2007 | Klaasen |
| 2007/0015060 A1 | 1/2007 | Klaasen |
| 2007/0037059 A1 | 2/2007 | Salot et al. |
| 2007/0048604 A1 | 3/2007 | Gaillard et al. |
| 2007/0067984 A1 | 3/2007 | Gaillard et al. |
| 2007/0238019 A1 | 10/2007 | Laurent et al. |

FOREIGN PATENT DOCUMENTS

| | | |
|---|---|---|
| EP | 0078404 | 5/1983 |
| EP | 0410627 | 1/1991 |
| EP | 0 414 902 | 3/1994 |
| EP | 0643544 | 3/1995 |
| EP | 0 691 697 A1 | 1/1996 |
| EP | 0860888 | 8/1998 |
| EP | 0867752 | 9/1998 |
| EP | 1 041 657 | 10/2000 |
| EP | 1675207 | 6/2006 |
| FR | 2862437 A1 | 5/2005 |
| GB | 2 318 127 A | 4/1998 |
| JP | 58126679 | 7/1983 |
| JP | 57230095 | 7/1984 |
| JP | 59123236 | 7/1984 |
| JP | 60012679 | 1/1985 |
| JP | 60182961 | 2/1987 |
| JP | 62044960 | 2/1987 |
| JP | 63166151 | 1/1990 |
| JP | 03205757 | 9/1991 |
| JP | 03262697 | 11/1991 |
| JP | 06067018 | 3/1994 |
| JP | 6111828 | 4/1994 |
| JP | 6196178 | 7/1994 |
| JP | 06223805 | 8/1994 |
| JP | 07006933 | 1/1995 |
| JP | 07-050229 | 2/1995 |
| JP | 07057739 | 3/1995 |
| JP | 08017179 | 1/1996 |
| JP | 08293310 | 5/1996 |
| JP | 08-236105 | 9/1996 |
| JP | 08287901 | 11/1996 |
| JP | 08329983 A2 | 12/1996 |
| JP | 09035233 | 2/1997 |
| JP | 09211204 | 8/1997 |
| JP | 10021896 | 1/1998 |
| JP | 10021933 | 1/1998 |
| JP | 2000188113 | 7/2000 |
| WO | WO-92/15140 | 9/1992 |
| WO | WO-92/16025 | 9/1992 |
| WO | WO-92/19090 | 10/1992 |
| WO | WO-93/14612 | 7/1993 |
| WO | WO-95/14311 | 5/1995 |
| WO | WO-97/38453 | 10/1997 |
| WO | WO-97/39491 | 10/1997 |
| WO | WO-98/13743 | 4/1998 |
| WO | WO-98/47196 | 10/1998 |
| WO | WO-99/25908 | 5/1999 |
| WO | WO-99/33124 | 7/1999 |
| WO | WO 00/66573 | 11/2000 |
| WO | WO-01/29565 A1 | 4/2001 |
| WO | WO 02/39205 | 5/2002 |
| WO | WO 02/47508 | 6/2002 |
| WO | WO 02/063856 | 8/2002 |
| WO | WO 2007/011898 | 1/2007 |
| WO | WO 2007/011899 | 1/2007 |
| WO | WO 2007/011900 | 1/2007 |

OTHER PUBLICATIONS

Aramoto, T., et al., "16.0% Efficient Thin-Film CdS/CdTe Solar Cells", *Jpn. J. Appl. Phys.*, vol. 36, Pt. 1, No. 10, (1997),6304-6305.

Birkmire, R. W., et al., "Polycrystalline Thin Film Solar Cells: Present Status and Future Potential", *Annu. Rev. Mater. Sci.*, 27, (1997),pp. 625-653.

Chu, T. L., et al., "13.4% efficient thin-film CdS/CdTe solar cells", *J. Appl. Phys.*, 70(12), (Dec. 15, 1991),pp. 7608-7612.

Dobley, Arthur, et al., "High Capacity Cathodes for Lithium-Air Batteries", Yardney Technical Products, Inc./Lithion, Inc. Pawcatuck, CT Electrochemical Society Conference,(May 20, 2004).

Dobley, Arthur, et al., "Non-aqueous Lithium-Air Batteries with an Advanced Cathode Structure", Yardney Technical Products, Inc. / Lithion, Inc. Pawcatuck, CT 41st Power Sources Conference Proceedings, Philadelphia, PA,(Dec. 10, 2003).

Dudney, N. J., et al., "Nanocrystalline LixMn2-yO4 Cathodes for Solid-State Thin-Film Rechargeable Lithium Batteries", *Journal of the Electrochemical Society*, 146(7), (1999),pp. 2455-2464.

Dunn, D., et al., "MoS2 Deposited by ion beam assisted deposition: 2H or random layer structure.", *Naval Research Laboratory*, (1998),pp. 3001-3007.

Goldner, R., et al., "Ambient Temperature Synthesis of Polycrystalline Thin Films of Lithium Cobalt Oxide with Controlled Crystallites Orientations", *Electrochemical Soc. Proceedings*, 98, (1999),268-273.

Goldner, R., et al., "Ambient Temperature Synthesis of Polycrystalline Thin Films of Lithium Cobalt Oxide with Controlled Crystallites' Orientation", *Mat. Res. Soc. Symp. Proc.*, 548, (1998),pp. 131-136.

Jacobson, A. J., "Intercalation Chemistry", *In: Encyclopedia of Inorganic Chemistry*, vol. 3, (1994),pp. 1556-1602.

Kyokane, J., et al., "Organic Solid Capacitor with Conducting Thin Films as Elecrolyte by Ion-Beam Assisted Deposition", *Journal of Power Sources*, 60, (1996),pp. 151-155.

Liu, W., et al., "Deposition, Structural Characterization, and Broadband (1KHz-40GHz) Dielectri Behavior of BaxTi2-xOy Thin Films", *Mat. Res. Soc. Symp. Proc.*, 310, (1993),pp. 157-162.

Lugscheider, E., et al., "Comparison of the Structure of PVD-Thin Films Deposited With Different Deposition Energies", *Surface and Coatings Technology*, 86-87 (1-3), (Dec. 1, 1996),177-183.

Martin, P. J., et al., "Modification of the Optical and Structural Properties of Dielectric ZrO2 Films by Ion-assisted Deposition", *Journal of Applied Physics*, 55, (1984),235-241.

McKenzie, D. R., et al., "New Technology for PACVD", *Surface and Coatings Technology*, 82 (3), (1996),326-333.

Nomoto, S., at al., "Back-up Performance of Electric Double-Layer Capacitors for Rechargeable Batteries", *Electrochemical Society Proceedings*, (1997),857.

Shodai, T, et al., "Reaction Mechanisms of Li(2.6)Co(0.4) Anode Material", *Solid State Ionics*, (1999),85-93.

Shukla, A. K., et al., "Electrochemical supercapacitors: Energy storage beyond batteries", *Current Science*, vol. 79, No. 12, (Dec. 25, 2000),1656-1661.

Vereda, F., et al., "A Study of Electronic Shorting in IBDA-deposited Lipon Films", *Journal of Power Sources*, 89, (2000),201-205.

Yoshida, T., "Photovoltaic Properties of Screen-Printed CdTe/CdS Solar Cells on Indium-Tin-Oxide Coated Glass Substrates", *J. Electrochem. Soc.*, 142 (9), (Sep. 1995),pp. 3232-3237.

Zeitler, M., et al., "In Situ Stress Analysis of Boron Nitride Films Prepared by Ion Beam Assisted Deposition", *Nuclear Instruments and Methods in Physics Research B*, 139, (1998),pp. 327-331.

Abraham, K.M. et al., "A Polymer Electrolyte-Based Rechargeable Lithium/Oxygen Battery," Journal of the Electrochemical Society, vol. 143, pp. 1-5 (1996).

Dudney, Nancy J., "Addition of a thin-film inorganic solid electrolyte (Lipon) as a protective film in lithium batteries with a liquid electrolyte," Journal of Power Sources, 89, 2000, pp. 176-179.

Read, J. "Characterization of the Lithium/Oxygen Organic Electrolyte Battery," Journal of the Electrochemical Society, 149, A1190-A1195 (2002).

West et al., "Fabrication and testing of all solid-state microscale lithium batteries for microspacecraft applications," Journal of Micromechanics and Microengineering, vol. 12, pp. 58-62, 2002 (Dec. 2001).

\* cited by examiner

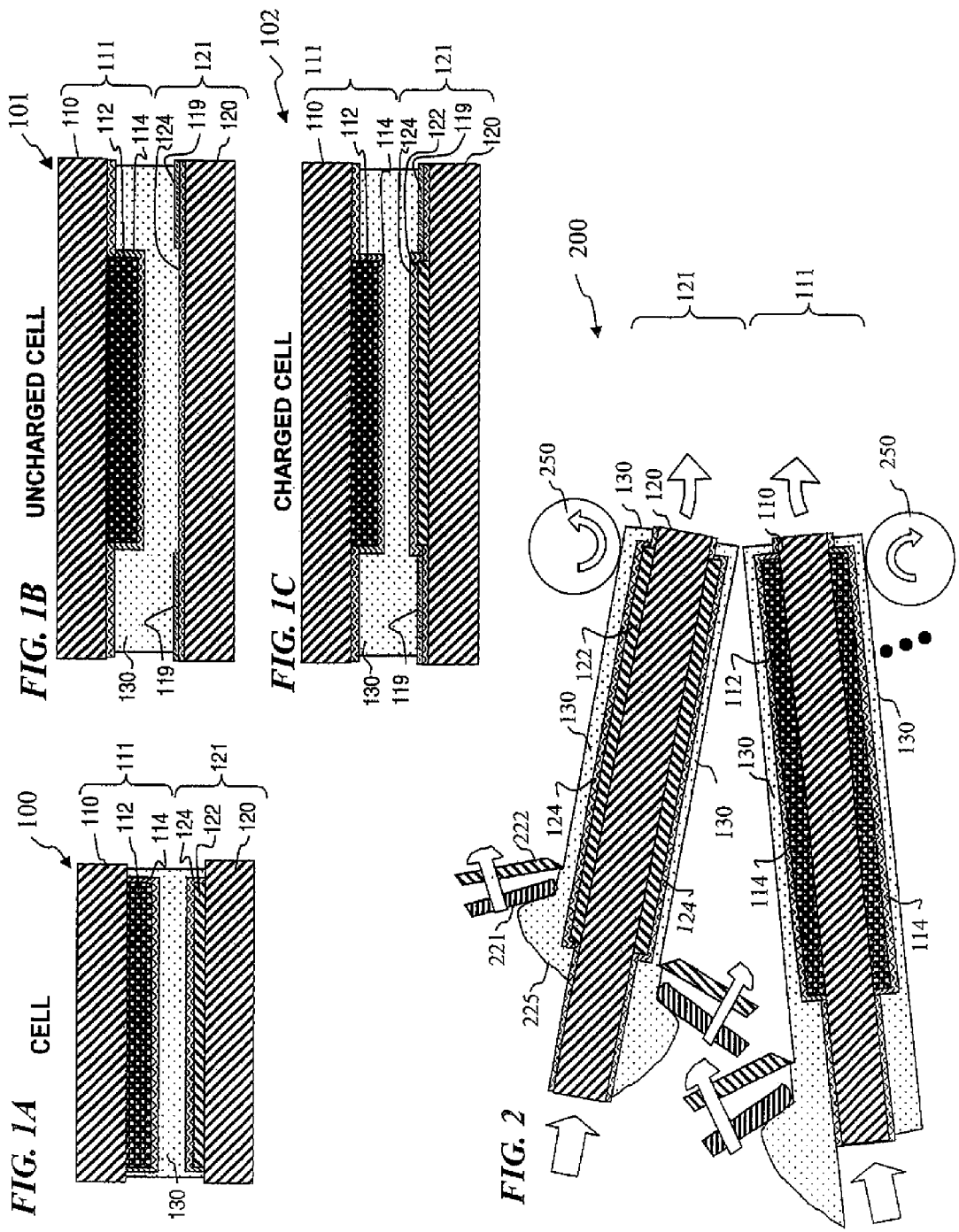

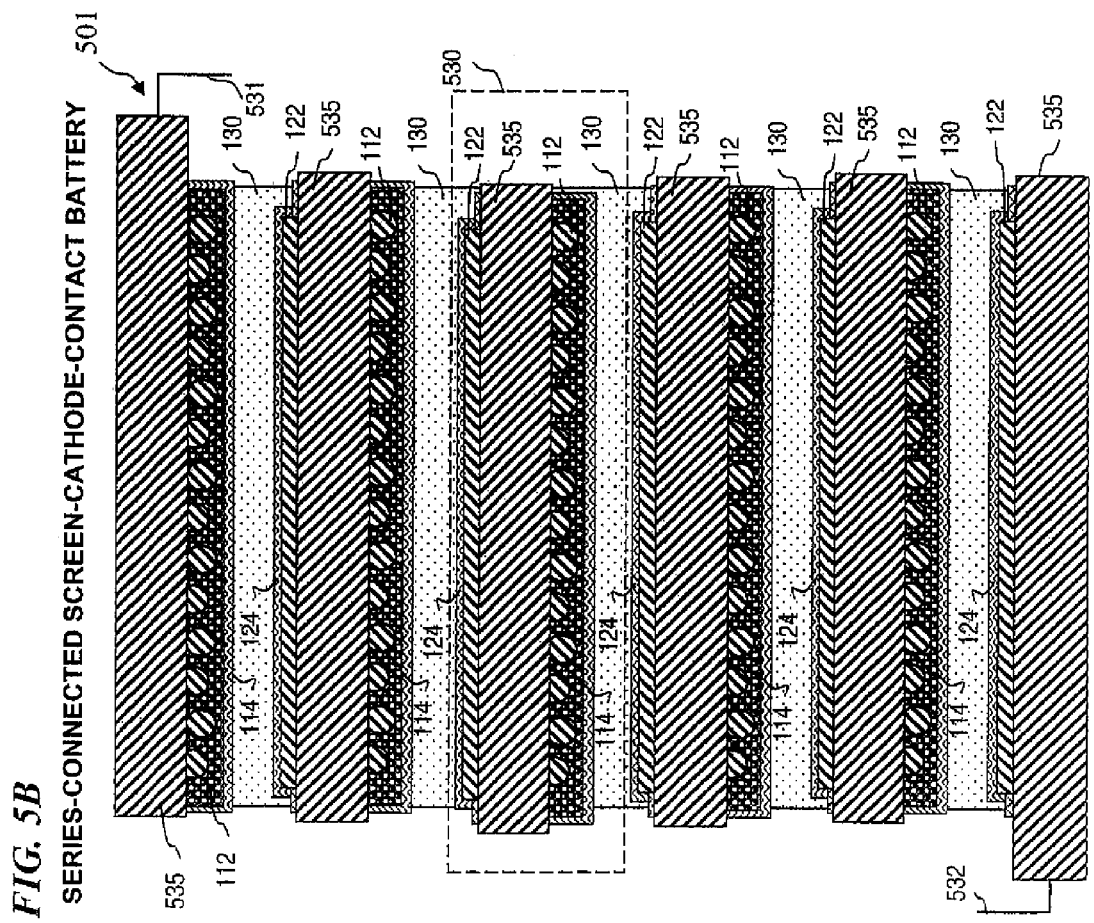
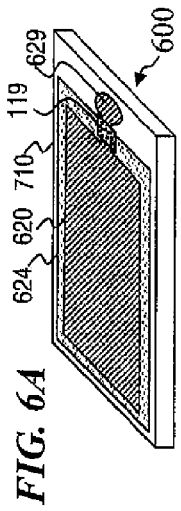
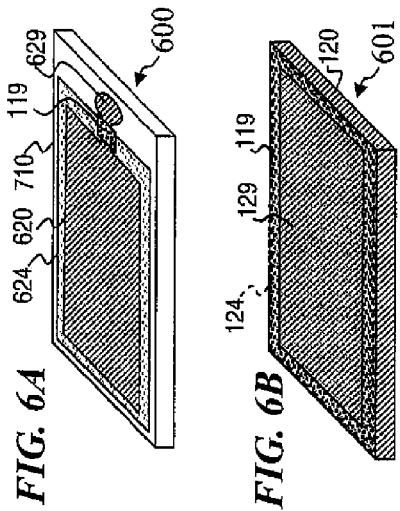
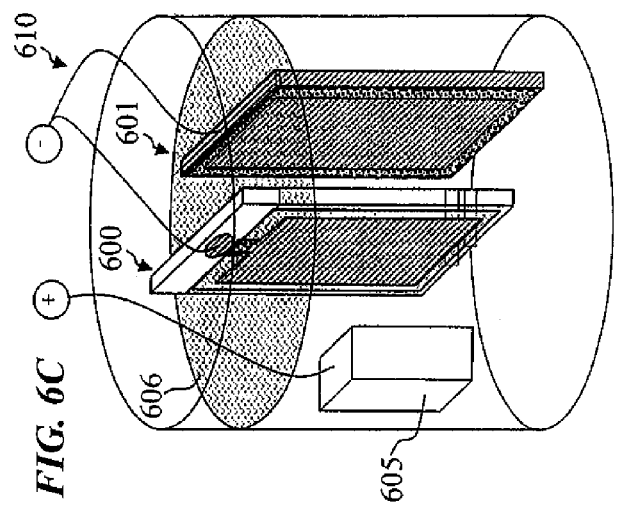
FIG. 5B SERIES-CONNECTED SCREEN-CATHODE-CONTACT BATTERY
FIG. 6A
FIG. 6B
FIG. 6C

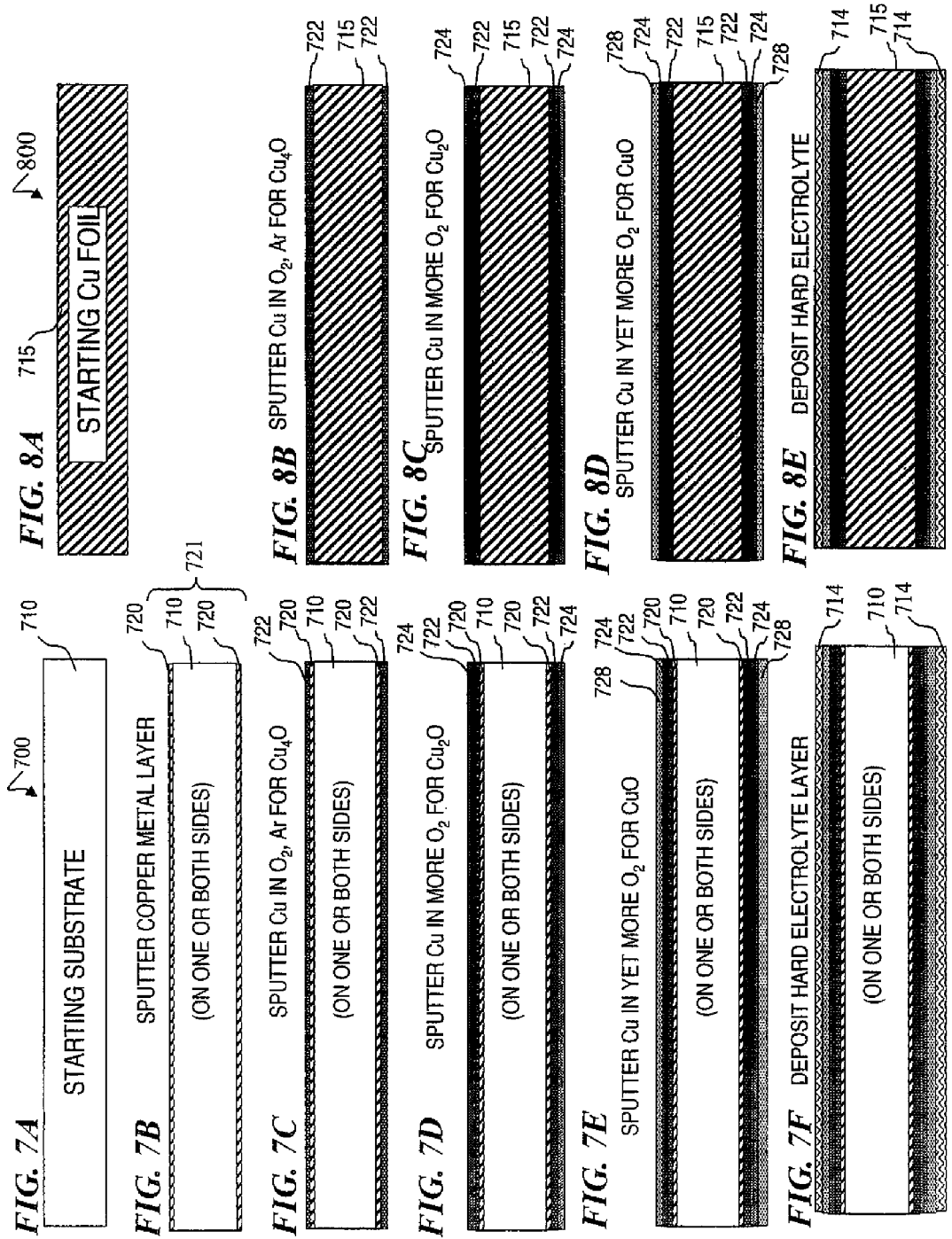

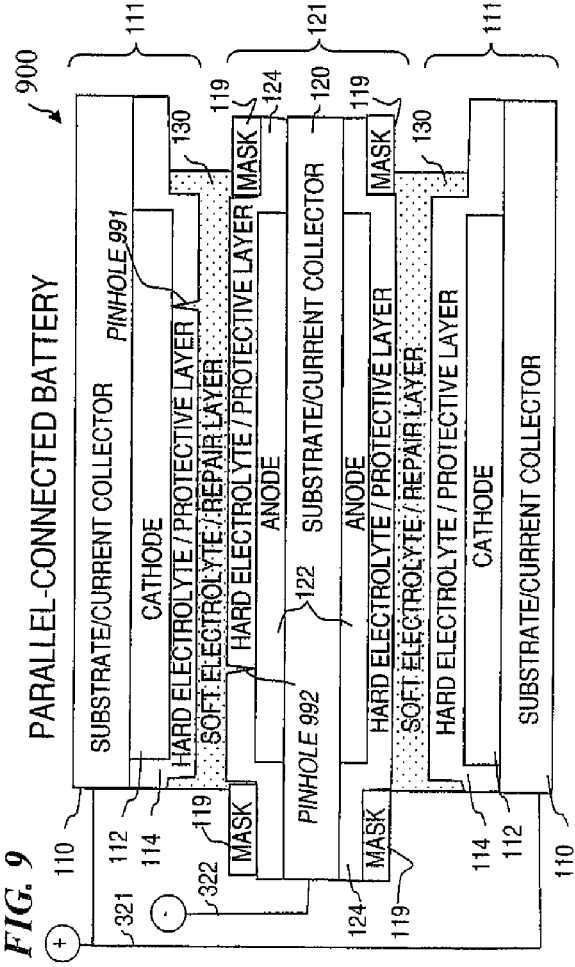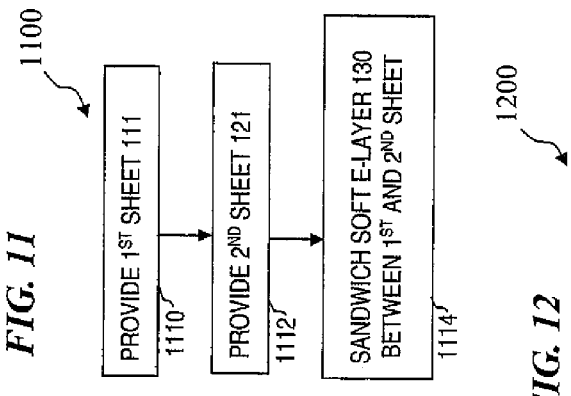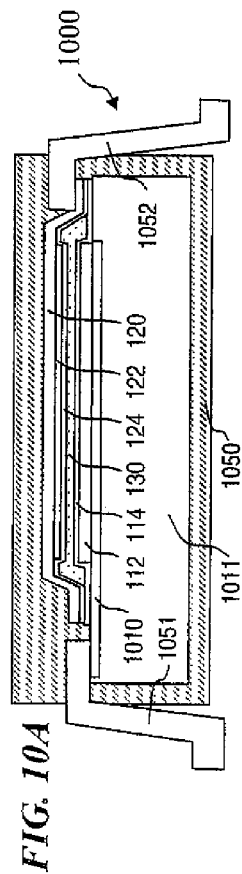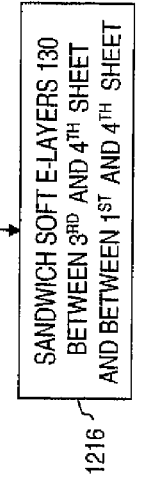

THIN-FILM BATTERIES WITH POLYMER AND LIPON ELECTROLYTE LAYERS AND METHOD

CROSS-REFERENCE TO RELATED APPLICATIONS

This invention is a divisional of U.S. Ser. No. 11/458,093, filed Jul. 17, 2006, now U.S. Pat. No. 7,776,478 by Klaassen, entitled "THIN-FILM BATTERIES WITH POLYMER AND LIPON ELECTROLYTE LAYERS AND METHOD," which claims benefit of U.S. Provisional Patent Application 60/699,895 filed Jul. 15, 2005, which is hereby incorporated by reference in its entirety. This is also related to U.S. patent application 10/895,445 entitled "LITHIUM/AIR BATTERIES WITH LiPON AS SEPARATOR AND PROTECTIVE BARRIER AND METHOD" filed Oct. 16, 2003 by J. Klaassen, the inventor of the present application, and to U.S. patent application Ser. No. 11/031,217 entitled "LAYERED BARRIER STRUCTURE HAVING ONE OR MORE DEFINABLE LAYERS AND METHOD" filed Jan. 6, 2005, U.S. patent application Ser. No. 11/458,091, entitled "THIN-FILM BATTERIES WITH SOFT AND HARD ELECTROLYTE LAYERS AND METHOD"and U.S. patent application Ser. No. 11,458,097, entitled "APPARATUS AND METHOD FOR MAKING THIN-FILM BATTERIES WITH SOFT AND HARD ELECTROLYTE LAYERS"filed on Jul. 17, 2006, which are all incorporated herein in their entirety by reference.

FIELD OF THE INVENTION

This invention relates to solid-state energy-storage devices, and more specifically to a method and apparatus for making thin-film (e.g., lithium) battery devices with a soft (e.g., polymer) electrolyte layer, and one or more hard layers (e.g., LiPON) as electrolyte layer(s) and/or protective barrier(s), and the resulting cell(s) and/or battery(s).

BACKGROUND OF THE INVENTION

Electronics have been incorporated into many portable devices such as computers, mobile phones, tracking systems, scanners, and the like. One drawback to portable devices is the need to include the power supply with the device. Portable devices typically use batteries as power supplies. Batteries must have sufficient capacity to power the device for at least the length of time the device is in use. Sufficient battery capacity can result in a power supply that is quite heavy and/or large compared to the rest of the device. Accordingly, smaller and lighter batteries (i.e., power supplies) with sufficient energy storage are desired. Other energy storage batteries (i.e., power supplies) with sufficient energy storage are desired. Other energy storage devices, such as supercapacitors, and energy conversion devices, such as photovoltaics and fuel cells, are alternatives to batteries for use as power supplies in portable electronics and non-portable electrical applications.

Another drawback of conventional batteries is the fact that some are fabricated from potentially toxic materials that may leak and be subject to governmental regulation. Accordingly, it is desired to provide an electrical power source that is safe, solid-state and rechargeable over many charge/discharge life cycles.

One type of an energy-storage device is a solid-state, thin-film battery. Examples of thin-film batteries are described in U.S. Pat. Nos. 5,314,765; 5,338,625; 5,445,906; 5,512,147; 5,561,004; 5,567,210; 5,569,520; 5,597,660; 5,612,152; 5,654,084; and 5,705,293, each of which is herein incorporated by reference. U.S. Pat. No. 5,338,625 describes a thin-film battery, especially a thin-film microbattery, and a method for making same having application as a backup or first integrated power source for electronic devices. U.S. Pat. No. 5,445,906 describes a method and system for manufacturing a thin-film battery structure formed with the method that utilizes a plurality of deposition stations at which thin battery component films are built up in sequence upon a web-like substrate as the substrate is automatically moved through the stations.

U.S. Pat. No. 6,805,998 entitled "METHOD AND APPARATUS FOR INTEGRATED BATTERY DEVICES" (which is incorporated herein by reference) issued Oct. 19, 2004, by Mark L. Jenson and Jody J. Klaassen (the inventor of the present application), and is assigned to the assignee of the present invention, described a high-speed low-temperature method for depositing thin-film lithium batteries onto a polymer web moving through a series of deposition stations.

K. M. Abraham and Z. Jiang, (as described in U.S. Pat. No. 5,510,209, which is incorporated herein by reference) demonstrated a cell with a non-aqueous polymer separator consisting of a film of polyacrylonitrile swollen with a propylene carbonate/ethylene carbonate/LiPF$_6$ electrolyte solution. This organic electrolyte membrane was sandwiched between a lithium metal foil anode and a carbon composite cathode to form the lithium-air cell. The utilization of the organic electrolyte allowed good performance of the cell in an oxygen or dry air atmosphere.

As used herein, the anode of the battery is the positive electrode (which is the anode during battery discharge) and the cathode of the battery is the negative electrode (which is the cathode during battery discharge). (During a charge operation, the positive electrode is the cathode and the negative electrode is the anode, but the anode-cathode terminology herein reflects the discharge portion of the cycle.)

U.S. Pat. No. 6,605,237 entitled "Polyphosphazenes as gel polymer electrolytes" (which is incorporated herein by reference), issued to Allcock, et al. on Aug. 12, 2003, and describes co-substituted linear polyphosphazene polymers that could be useful in gel polymer electrolytes, and which have an ion conductivity at room temperature of at least about $10^{-5}$ S/cm and comprising (i) a polyphosphazene having controlled ratios of side chains that promote ionic conductivity and hydrophobic, non-conductive side chains that promote mechanical stability, (ii) a small molecule additive, such as propylene carbonate, that influences the ionic conductivity and physical properties of the gel polymer electrolytes, and (iii) a metal salt, such as lithium trifluoromethanesulfonate, that influences the ionic conductivity of the gel polymer electrolytes, and methods of preparing the polyphosphazene polymers and the gel polymer electrolytes. Allcock et al. discuss a system that has been studied extensively for solid-polymer electrolyte (SPE) applications, which is one that is based on poly(organophosphazenes). This class of polymers has yielded excellent candidates for use in SPEs due to the inherent flexibility of the phosphorus-nitrogen backbone and the ease of side group modification via macromolecular substitution-type syntheses. The first poly(organophosphazene) to be used in a phosphazene SPE (solid polymer electrolyte) was poly[bis(2-(2'-methoxyethoxy ethoxy)phosphazene] (hereinafter, MEEP). This polymer was developed in 1983 by Shriver, Allcock and their coworkers (Blonsky, P. M., et al, Journal of the American Chemical Society, 106, 6854 (1983)) and is illustrated in U.S. Pat. No. 6,605,237.

Also, the following U.S. Pat. No. 7,052,805 (Polymer electrolyte having acidic, basic and elastomeric subunits, published/issued on 2006 May 30); U.S. Pat. No. 6,783,897 (Crosslinking agent and crosslinkable solid polymer electrolyte using the same, 2004 Aug. 31); U.S. Pat. No. 6,727,024 (Polyalkylene oxide polymer composition for solid polymer electrolytes, 2004 Apr. 27); U.S. Pat. No. 6,392,008 (Polyphosphazene polymers, 2002 May 21); U.S. Pat. No. 6,369,159 (Antistatic plastic materials containing epihalohydrin polymers, 2002 Apr. 9); U.S. Pat. No. 6,214,251 (Polymer electrolyte composition, 2001 Apr. 10); U.S. Pat. No. 5,998,559 (Single-ion conducting solid polymer electrolytes, and conductive compositions and batteries made therefrom; 1999 Dec. 7); U.S. Pat. No. 5,874,184 (Solid polymer electrolyte, battery and solid-state electric double layer capacitor using the same as well as processes for the manufacture thereof, 1999 Feb. 23); U.S. Pat. No. 5,698,664 (Synthesis of polyphosphazenes with controlled molecular weight and polydispersity, 1997 Dec. 16); U.S. Pat. No. 5,665,490 (Solid polymer electrolyte, battery and solid-state electric double layer capacitor using the same as well as processes for the manufacture thereof, 1997 Sep. 9); U.S. Pat. No. 5,633,098 (Batteries containing single-ion conducting solid polymer electrolytes, 1997 May 27); U.S. Pat. No. 5,597,661 (Solid polymer electrolyte, battery and solid-state electric double layer capacitor using the same as well as processes for the manufacture thereof, 1997 Jan. 28); U.S. Pat. No. 5,567,783 (Polyphosphazenes bearing crown ether and related podand side groups as solid solvents for ionic conduction, 1996 Oct. 22); U.S. Pat. No. 5,562,909 (Phosphazene polyelectrolytes as immunoadjuvants, 1996 Oct. 8); U.S. Pat. No. 5,548,060 (Sulfonation of polyphosphazenes, 1996 Aug. 20); U.S. Pat. No. 5,414,025 (Method of crosslinking of solid state battery electrolytes by ultraviolet radiation, 1995 May 9); U.S. Pat. No. 5,376,478 (Lithium secondary battery of vanadium pentoxide and polyphosphazenes, 1994 Dec. 27); U.S. Pat. No. 5,219,679 (Solid electrolytes, 1993 Jun. 15); U.S. Pat. No. 5,110,694 (Secondary Li battery incorporating 12-Crown-4 ether, 1992 May 5); U.S. Pat. No. 5,102,751 (Plasticizers useful for enhancing ionic conductivity of solid polymer electrolytes, 1992 Apr. 7); U.S. Pat. No. 5,061,581 (Novel solid polymer electrolytes, 1991 Oct. 29); U.S. Pat. No. 4,656,246 (Polyetheroxy-substituted polyphosphazene purification, 1987 Apr. 7); and U.S. Pat. No. 4,523,009, (Polyphosphazene compounds and method of preparation, 1985 Jun. 11), which are all incorporated herein by reference. Each discuss polyphosphazene polymers and/or other polymer electrolytes and/or lithium salts and combinations thereof U.S. patent application Ser. No. 10/895,445 entitled "LITHIUM/AIR BATTERIES WITH LiPON AS SEPARATOR AND PROTECTIVE BARRIER AND METHOD" by the inventor of the present application (which is incorporated herein by reference) describes a method for making lithium batteries including depositing UPON on a conductive substrate (e.g., a metal such as copper or aluminum) by depositing a chromium adhesion layer on an electrically insulating layer of silicon oxide by vacuum sputter deposition of 50 nm of chromium followed by 500 nm of copper. In some embodiments, a thin film of LiPON (Lithium Phosphorous OxyNitride) is then formed by low-pressure (<10 mtorr) sputter deposition of lithium orthophosphate ($Li_3PO_4$) in nitrogen. In some embodiments of the Li-air battery cells, LiPON was deposited over the copper anode current-collector contact to a thickness of 2.5 microns, and a layer of lithium metal was formed onto the copper anode current-collector contact by electroplating through the LiPON layer in a propylene carbonate/$LiPF_6$ electrolyte solution. In some embodiments, the air cathode was a carbon-powder/polyfluoroacrylate-binder coating (Novec-1700) saturated with a propylene carbonate/$LiPF_6$ organic electrolyte solution. In other embodiments, a cathode-current-collector contact layer having carbon granules is deposited, such that atmospheric oxygen could operate as the cathode reactant. This configuration requires providing air access to substantially the entire cathode surface, limiting the ability to densely stack layers for higher electrical capacity (i.e., amp-hours).

There is a need for rechargeable lithium-based batteries having improved protection against dendrite formation and with improved density, electrical capacity, rechargeability, and reliability, and smaller volume and lowered cost.

BRIEF SUMMARY OF THE INVENTION

In some embodiments, the present invention includes a battery having an electrolyte structure that combines a plurality of layers of different electrolytes (e.g., hard-soft-hard). In some embodiments, a thin (0.1 to 1.0 micron) LiPON electrolyte layer serves as a hard coating on the negative electrode preventing the formation of lithium dendrites (especially when paired with a corresponding LiPON electrolyte layer coating on the positive electrode) and/or providing an even (smooth), hard layer of lithium metal on, or as part of, the negative electrode when the battery is charged. In some embodiments, a thin (0.1 to 1.0 micron) LiPON electrolyte on only one electrode (e.g., the negative electrode) may not prevent the formation of lithium dendrites over the long term (e.g., many thousands of discharge-recharge cycles), since the lithium growing through a pinhole may only need to grow about 3 microns or less across the electrolyte to short the battery (i.e., providing a metal electrical conduction path directly from anode to cathode). When LiPON is also used as a coating at the positive electrode (e.g., an electrode that includes $LiCoO_2$) the random locations of the pinholes will not line up (e.g., across the electrolyte from anode to cathode) so lithium would also need to grow sideways in the electrolyte, which doubly ensures that lithium plating at a defect site (which would typically form a dendrite) will not short the battery. In some embodiments, a soft electrolyte layer bridges the gap between the hard electrolyte layer on the negative electrode and the hard electrolyte layer on the positive electrode. At both electrodes, the LiPON layer also provides an improvement in environmental resistance to water vapor and oxygen, especially during manufacture before the battery is completed and otherwise sealed. In some embodiments, the soft electrolyte includes a solid polymer electrolyte (SPE) layer that is located between and contacts with the LiPON layer on the positive electrode and the LiPON layer on the negative electrode. In some embodiments, the electrolyte structure includes a polymer electrolyte such as PEO-LiX (poly-ethylene oxide lithium-X, where LiX=a metal salt, such as LiPF6, $LiBF_4$, $LiCF_3SO_4$, $CF_3SO_3Li$ (lithium trifluoromethanesulfonate, also called triflate), lithium bisperfluoroethanesulfonimide, lithium (Bis) Trifluoromethanesulfonimide, and/or the like, for example). In some embodiments, the electrolyte structure includes a polymer electrolyte such as polyPN-LiX (Polyphosphazene with lithium-X, where LiX=$LiPF_6$, $LiBF_4$, $LiCF_3SO_4$, and/or the like, for example). In some embodiments, a small-molecule additive, such as propylene carbonate, that influences the ionic conductivity and physical properties of the polymer electrolytes is added to form a gel electrolyte that better fills defects and acts as an adhesive.

The present invention provides both a method and an apparatus for making thin-film batteries having composite (e.g., multi-layered) electrolytes with a soft electrolyte layer between hard electrolyte layers covering the negative and/or positive electrodes, and the resulting batteries. In some embodiments, metal-core cathode sheets each having a cathode material (e.g., LiCoO2) deposited on a metal foil, screen, or mesh (e.g., copper, nickel, or stainless steel) or a metal-covered insulator (e.g., a sputtered metal film on a polymer film, a SiO2-covered silicon wafer, or an alumina or sapphire substrate) and is covered by a hard electrolyte (some embodiments form such electrodes on both sides of the substrate), and foil-core anode sheets having a anode material (e.g., lithium metal) deposited on a metal foil (e.g., copper, nickel, or stainless steel) or a metal-covered insulator (e.g., a sputtered metal film on a polymer film, a SiO2-covered silicon wafer, or an alumina or sapphire substrate) and is also covered by a hard electrolyte (some embodiments form such electrodes on both sides of the substrate), and such sheets are laminated using a soft (e.g., polymer gel) electrolyte sandwiched between alternating cathode and anode sheets. In some embodiments, a hard glass-like electrolyte layer obtains a smooth hard positive-electrode lithium-metal layer upon charging, but when such a layer is made very thin, will tend to have randomly spaced pinholes/defects. When the hard layers are formed on both the positive and negative electrodes, one electrode's dendrite-short-causing defects on are not aligned with the other electrode's defects. The soft electrolyte layer conducts ions across the gap between hard electrolyte layers and/or fills pinholes, thin spots, and other defects in the hard electrolyte layers.

BRIEF DESCRIPTION OF THE DRAWINGS

FIG. 1A is a schematic cross-section view of a lithium cell 100 of some embodiments of the invention.

FIG. 1B is a schematic cross-section view of a lithium cell 101 of some embodiments of the invention.

FIG. 1C is a schematic cross-section view of a lithium cell 102 of some embodiments of the invention.

FIG. 2 is a schematic cross-section view of a lithium-battery manufacturing process 200 of some embodiments of the invention.

FIG. 5B is a schematic cross-section view of a series-connected screen-cathode-current-collector contact lithium-battery 501 of some embodiments of the invention.

FIG. 6A is a perspective view of an electrode 600 having a hard-electrolyte-covered current collector with a plating mask 119.

FIG. 6B is a perspective view of another electrode 601 having a hard-electrolyte-covered current collector with a plating mask 119.

FIG. 6C is a perspective view of a plating system 610.

FIGS. 7A, 7B, 7C, 7D, 7E, and 7F are schematic cross-sectional views of the fabrication of an atomic level matrix of copper and copper oxides as cathodes on a substrate of some embodiments of the invention.

FIGS. 8A, 8B, 8C, 8D, and 8E are schematic cross-sectional views of the fabrication of an atomic level matrix of copper and copper oxides as cathodes on a copper foil substrate of some embodiments of the invention.

FIG. 9 is a schematic cross-section view of a parallel-connected foil-cathode-current-collector contact lithium battery 900 of some embodiments of the invention.

FIG. 10A is a schematic cross-section view of an encapsulated surface-mount micro-battery 1000 of some embodiments of the invention.

FIG. 10B is a perspective view of an encapsulated surface-mount micro-battery 1000 of some embodiments of the invention.

FIG. 11 is a flow chart of a method 1100 for making a battery cell according to some embodiments of the invention.

FIG. 12 is a flow chart of a method 1200 for making a stacked battery according to some embodiments of the invention.

DETAILED DESCRIPTION OF THE INVENTION

Figure 3:
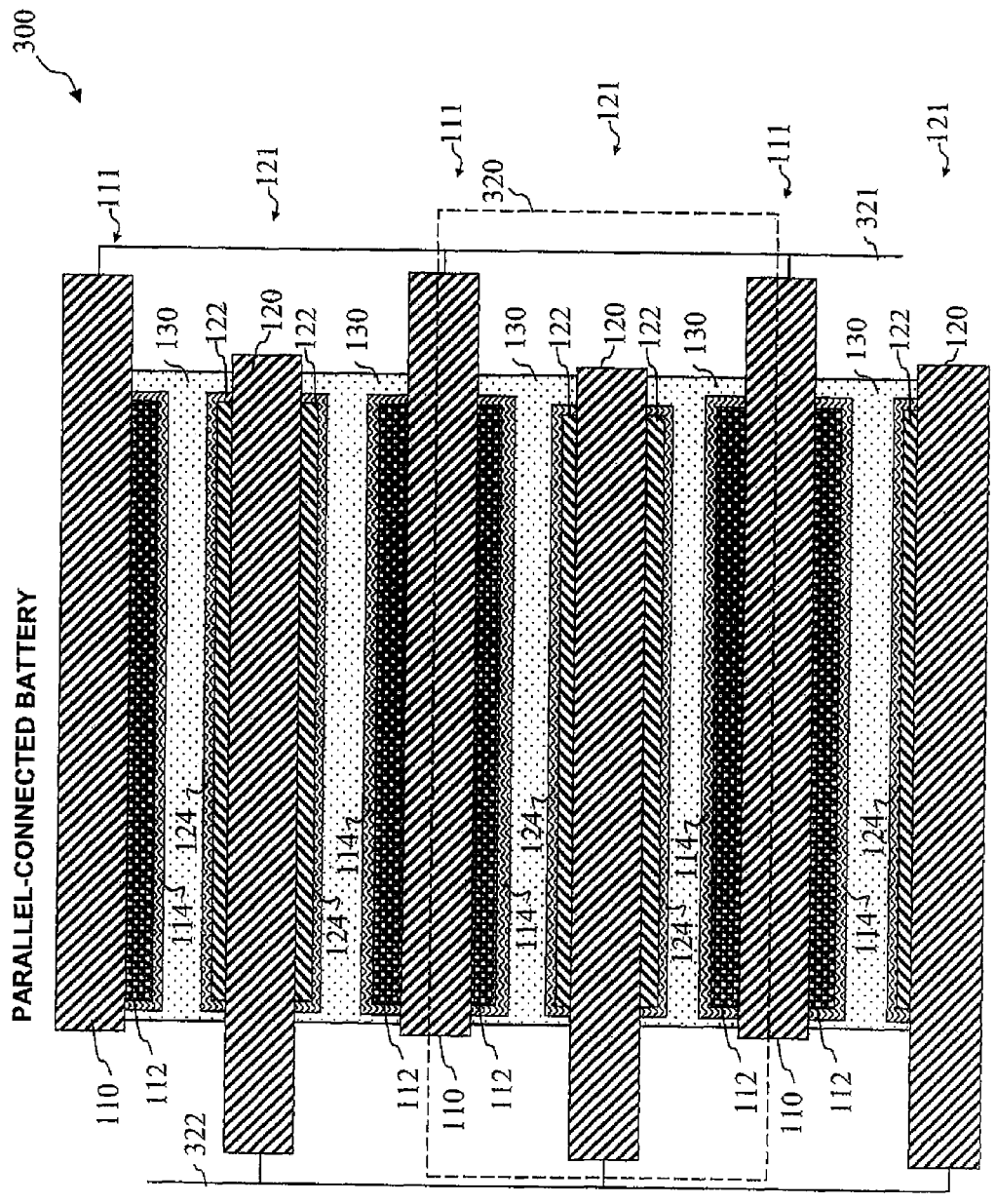
FIG. 3 is a schematic cross-section view of a parallel-connected lithium battery 300 of some embodiments of the invention.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally correspond to the Figure number in which that component is first introduced, such that the same reference number is used throughout to refer to an identical component, which appears in multiple Figures. Signals (such as, for example, fluid pressures, fluid flows, or electrical signals that represent such pressures or flows), pipes, tubing or conduits that carry the fluids, wires or other conductors that carry the electrical signals, and connections may be referred to by the same reference number or label, and the actual meaning will be clear from its use in the context of the description.

Terminology

In this description, the term metal applies both to substantially pure single metallic elements and to alloys or combinations of two or more elements, at least one of which is a metallic element.

The term substrate or core generally refers to the physical structure that is the basic work piece that is transformed by various process operations into the desired microelectronic configuration. In some embodiments, substrates include conducting material (such as copper, stainless steel, aluminum and the like), insulating material (such as sapphire, ceramic, or plastic/polymer insulators and the like), semiconducting materials (such as silicon), non-semiconducting, or combinations of semiconducting and non-semiconducting materials. In some other embodiments, substrates include layered structures, such as a core sheet or piece of material (such as iron-nickel alloy and the like) chosen for its coefficient of thermal expansion (CTE) that more closely matches the CTE of an adjacent structure such as a silicon processor chip. In some such embodiments, such a substrate core is laminated to a sheet of material chosen for electrical and/or thermal conductivity (such as a copper, aluminum alloy and the like), which in turn is covered with a layer of plastic chosen for electrical insulation, stability, and embossing characteristics. An electrolyte is a material that conducts electricity by allowing movement of ions (e.g., lithium ions having a positive charge) while being non-conductive or highly resistive to electron conduction. An electrical cell or battery is a device having an anode and a cathode that are separated by an electrolyte. A dielectric is a material that is non-conducting to electricity, such as, for example, plastic, ceramic, or glass. In some embodiments, a material such as LiPON can act as an electrolyte when a source and sink for lithium are adjacent the LiPON layer, and can also act as a dielectric when placed between two metal layers such as copper or aluminum, which do not form ions that can pass through the LiPON. In some embodiments, devices include an insulating plastic/polymer layer (a dielectric) having wiring traces that carry signals and electrical power horizontally, and vias that carry signals and electrical power vertically between layers of traces.

In some embodiments, an anode portion of a thin-film solid-state battery is made (as described in U.S. patent application Ser. No. 10/895,445 discussed above) using a method that includes depositing LiPON on a conductive substrate (e.g., a metal such as copper or aluminum) that is formed by depositing a chromium adhesion layer on an electrically insulating layer of silicon oxide (or on a polymer sheet) using vacuum-sputter deposition of 50 nm of chromium followed by 500 nm of copper. In some embodiments, a thin film of LiPON (Lithium Phosphorous OxyNitride) is then formed by low-pressure (<10 mtorr) sputter deposition of lithium orthophosphate ($Li_3PO_4$) in nitrogen, or by sputtering from a LiPON source. In some embodiments LiPON is deposited over the copper anode current-collector contact to a thickness of between 0.1 microns and 2.5 microns. In some embodiments, a layer of lithium metal is formed onto the copper anode current-collector contact by electroplating through the LiPON layer (which was earlier deposited on the copper anode current-collector contact) in a propylene carbonate/$LiPF_6$ organic electrolyte solution. The LiPON acts as a protective layer during fabrication of the battery, and in the assembled battery, it operates as one layer of a multi-layer electrolyte. (In other embodiments, the layer of lithium metal of the anode is formed by an initial charging operation after the battery is assembled.) In some embodiments, a cathode portion of the thin-film solid-state battery is made sputtering $LiCoO_2$ onto a first of metal foil from a $LiCoO_2$ source, over which is deposited a LiPON layer, which in the assembled battery, operates as another layer of the multi-layer electrolyte. In some embodiments, a solid or gel polymer electrolyte is used as a structural connection or adhesive between the two LiPON electrolyte layers, as well as forming an ion-conductive path between the positive and negative electrodes of the battery.

It is desirable, in some embodiments, to form a very thin electrolyte. If a single very thin layer of LiPON is used, it tends to have defects (e.g., thin spots or pinholes) and lithium ions will preferentially travel through these paths of least resistance and plate to spike-shaped lithium-metal dendrites that short out the battery. If a single very thin solid or gel polymer electrolyte layer is used, any surface irregularities (e.g., bumps or ridges in the anode or cathode material) will tend to connect through the electrolyte and short the battery. By having two independently formed very thin LiPON (hard) electrolyte component layers, one formed on the battery's anode and another formed on the battery's cathode, any such thin spots or pinholes in one layer will not line up with a thin spot or pinhole in the other layer. The third electrolyte layer (e.g., a soft polymer electrolyte that conducts lithium ions between the two LiPON layers) made of a solid and/or gel polymer electrolyte material does not get shorted out by bumps or other irregularities in either electrode since those irregularities will tend to be coated with LiPON and/or the corresponding spot on the other side will be coated with LiPON. Accordingly, one or more (even all) of the plurality of layers can be made very thin without the danger of having an initial short (from a polymer electrolyte that is too thin allowing the anode and cathode to touch) or a later-developed short (from a pinhole in a LiPON electrolyte layer that allows formation of a lithium-metal dendrite after one or more charge/discharge cycles). Further, the dense, hard, glass-like LiPON layer causes the lithium ions that pass through it to form a lithium-metal layer that is dense and smooth. In other embodiments, one or more other hard and/or glass-like electrolyte layers are used instead of one or more of the LiPON layers.

U.S. Pat. No. 6,605,237 entitled "Polyphosphazenes as gel polymer electrolytes" discusses MEEP (poly[bis(2-(2'-methoxyethoxy ethoxy)phosphazene]) and other polymers, which are used in some embodiments of the present invention as structural connector and polymer electrolyte sublayer between two UPON sublayers. The polyphosphazene (herein called polyPN) used as the connective layer is soft and sticky. Its adhesive properties are what allow the electrode to be and to remain joined. Its softness allows for defect correction and/or for defects to not cause poor battery performance and reliability. In other embodiments, other soft or gel-like ion-conducting polymers are used.

U.S. Pat. Nos. 4,523,009, 5,510,209, 5,548,060, 5,562,909, 6,214,251, 6,392,008 6,605,237, and 6,783,897 (which are all incorporated herein by reference) each discuss polyphosphazene polymers and/or other polymer electrolytes and/or various lithium salts and compounds that can be used as, or included in, one or more component layers of an electrolyte in some embodiments of the present invention.

The term vertical is defined to mean substantially perpendicular to the major surface of a substrate. Height or depth refers to a distance in a direction perpendicular to the major surface of a substrate.

FIG. 1A is a schematic cross-section view of a lithium cell 100 of some embodiments of the invention. In some embodiments, cell 100 includes a first sheet 111 (a cathode or positive-electrode subassembly) having a first metal foil 110 (which acts as a current collector) onto which is deposited a film of cathode material 112, such as, for example, $LiCoO_2$, for example, by sputtering from a $LiCoO_2$ target, and over which is deposited a relatively hard LiPON layer 114 (which acts as a hard-electrolyte current spreader). In some embodiments, cell 100 includes a second sheet 121 (an anode or negative-electrode subassembly) having a second metal foil 120 (which acts as a current collector) onto which is deposited a film of LiPON 124 (which acts as a hard-electrolyte current spreader and as an environmental barrier for lithium that is later plated through this layer), and a layer of lithium 122 (which forms the active portion of the anode or negative-electrode) is plated through the LiPON film 124 (either before or after the entire battery is assembled: if the cathode contains sufficient lithium to start, then the anode lithium layer is formed after assembly by the initial charging of the battery, while if the cathode has little or no lithium to start with, then the anode lithium layer is formed before assembly, e.g., by electroplating in a liquid electrolyte or solution from an external sacrificial lithium-metal electrode). In some embodiments, a sheet or layer of polymer electrolyte 130 is sandwiched between the first sheet 111 and the second sheet 121. In some embodiments, the layer of the polymer electrolyte is deposited onto LiPON layer 114, LiPON layer 124, or a portion of the polymer electrolyte is deposited onto both LiPON layer 114 and LiPON layer 124, and then the first sheet 111 and the second sheet 121 are pressed together or otherwise assembled (in some embodiments, two or more of the sheets are squeezed together between a pair of rollers).

In some embodiments, it is the hard-soft-hard combination of electrolyte layers that provide a low-cost, high-quality, high-reliability, highly rechargeable battery system. In some embodiments, the hard layers act as protective barrier layers during manufacture and as current spreader electrolytes that obtain a smooth hard layer of lithium on the anode upon charging. In some embodiments, the hard layers are or include a glass or glass-like electrolyte material (e.g., LiPON). When they are made very thin (in order to increase cell conductivity and reduce cell resistance), these hard layers tend to have randomly spaced pinholes, bumps, or other defects (thicker layers can eliminate many such defects, but will have decreased cell conductivity and increased cell resistance). When the hard layers are formed on both the positive electrode and the corresponding negative electrode, the pinholes and defects of the electrolyte covering one electrode will tend not to be aligned with the pinholes and defects of the electrolyte covering the other electrode. The soft electrolyte layer both conducts ions across the gap between hard layers and tends to fill the pinholes and defects of the hard electrolyte coverings. In some embodiments, the soft electrolyte layer can be a solid or gel polymer electrolyte (these also act as adhesives to hold the cells together and as seals to reduce contamination of the cell from environmental factors and to reduce leakage of the soft electrolyte layer), or can be a liquid electrolyte, optionally infused in a structural element (such as a sponge, screen, or ridges formed of a host solid-polymer (e.g., polyethylene, polypropylene, fluoroethylene or the like) on one or more of the hard electrolyte layers (e.g., by microembossing).

In some embodiments, the soft electrolyte layer includes a gel that includes a polyvinylidene difluoride (PVdF), propylene carbonate, and a lithium salt. PVdF is a polymer that does not conduct lithium ions, that is, lithium salts will not dissolve in PVdF. However, PVdF can be swollen with a liquid such as propylene carbonate in which a lithium salt has been dissolved. The gel that results can be used as a soft electrolyte.

In some embodiments, the thickness of each of the hard electrolyte layers is one micron or thinner, and the thickness of the soft electrolyte layer is about three microns or thinner. The structure shown in FIG. 1A is also represented in the following Table 1:

TABLE 1

| Reference Number | Function or Property | Example Materials |
| --- | --- | --- |
| ... | | optionally, more battery layers stacked above ... |
| 110 | cathode current collector | metal foil (e.g., one that does not alloy with Li, such as copper, nickel, stainless steel and the like), metal screen, or metal film on polymer film or $SiO_2$ layer on Si wafer, (can have electrode formed on both sides for battery stack) |
| 112 | cathode material | $LiCoO_2$ (sputtered or powder-pressed in place), carbon powder, CuO powder (any of the above can be infused with polyPN electrolyte material to increase conductivity and lithium transport), or atomic matrix of copper and copper oxides (which, in some embodiments, includes a tapered composition Cu and O structure with more copper towards the top and more oxygen towards the bottom, e.g., Cu metal gradually mixed to ...$Cu_4O$...$Cu_2O$...$Cu^+O^{--}$...$CuO$) |

TABLE 1-continued

| Reference Number | Function or Property | Example Materials |
| --- | --- | --- |
| 114 | hard electrolyte | LiPON or other lithium-glass material |
| 130 | soft electrolyte | polyPN with lithium (e.g., $LiPF_6$), or other polymer (e.g., PEO, polypropylene, etc.) electrolyte material |
| 124 | hard electrolyte | LiPON or other lithium-glass material |
| 122 | anode material | Lithium, (can be plated through the hard (e.g., LiPON) layer before or after assembly) (could be zinc with suitable changes to electrolytes and cathode material) |
| 110 | anode current collector | metal foil (e.g., copper), metal screen, or metal film on polymer film or $SiO_2$ layer on Si wafer, (can have electrode formed on both sides for battery stack) |
| ... | | optionally, more battery layers stacked below |

FIG. 1B is a schematic cross-section view of a lithium cell 101 of some embodiments of the invention. In some embodiments, cell 101, which is assembled in an uncharged state, includes a first sheet 111 (a cathode or positive-electrode subassembly) similar to that of FIG. 1A, except that the hard electrolyte 114 extends laterally over first metal foil 110 well beyond the lateral edges of the film of cathode material 112. In some embodiments, the lateral extent of cathode material 112 (such as, for example, $LiCoO_2$, for example) is defined using photoresist and lithographic processes similar to those used for semiconductor integrated circuits (e.g., the cathode material is masked using photoresist, or a hard material such as $SiO_2$ covered by photoresist and etched and the photoresist is removed so that the hard layer (e.g., $SiO_2$) acts as the mask, to define the lateral extent of cathode material 112 (e.g., $LiCoO_2$), and the mask is then removed. The hard electrolyte layer 114 (e.g., LiPON) is deposited on the cathode material 112 as well as onto substrate 110 around the sides of cathode material 112. This sideward extension of the hard UPON layer 114 acts as a seal to the sides of the lithium in the cathode to protect it from environmental contaminants such as oxygen or water vapor. In some embodiments, cell 101 includes a second sheet 121 (an anode or negative-electrode subassembly similar to that of FIG. 1A, except that no lithium is yet present) having a second metal foil 120 (which acts as a current collector) onto which is deposited a film of LiPON 124 (which acts as a hard-electrolyte current spreader and as an environmental barrier for lithium that is later plated through this layer), and a mask layer 119 around all of the sides of what will be plated lithium layer 122 (see FIG. 1C) that is later plated through the portions of LiPON film 124 not covered by mask 119 (after the entire battery is assembled). (In other embodiments, mask layer 119 is an electrical insulator, such as $SiO_2$, deposited directly on metal foil 120, and photolithographically patterned to expose the metal substrate in the center, and the hard electrolyte layer LiPON film 124 is deposited on top of the mask layer). In some embodiments, the mask material 119 is photoresist and/or an insulator such as $SiO_2$ that have lateral extents that are photolithographically defined. As above, in some embodiments, a layer of soft polymer electrolyte 130 (either a solid polymer electrolyte (SPE) or a gel or liquid polymer electrolyte) (such as polyphosphazene having lithium salts such as $LiPF_6$ to assist lithium conductivity) is sandwiched between the first sheet 111 and the second sheet 121.

FIG. 1C is a schematic cross-section view of a lithium cell 102 of some embodiments of the invention. In some embodiments, the lithium metal layer 122 is plated before assembly (a combination of the methods described for FIG. 6C and FIG. 2 below). In other embodiments, a battery 101 (such as shown in FIG. 1B) is assembled before any lithium metal is in the anode assembly 121, and is initially charged by plating lithium from the cathode 112 through electrolyte layers 114, 130, and 124 and onto the anode current collector 120 to form lithium metal layer 122.

FIG. 2 is a schematic cross-section view of a lithium-battery manufacturing process 200 of some embodiments of the invention. In some embodiments, one or more double-sided anode sheets 121 are alternated with one or more cathode sheets 111 (wherein an cathode material 112 is deposited on both major faces of foil 110 inside of LiPON layer 114), with a polymer layer 130 placed or formed between each sheet. In some embodiments of anode sheets 121, an anode material 122 is deposited on both major faces of foil 120 inside of (or plated through) LiPON layer 124 (note that, in some embodiments, by this stage, the mask 119 (see FIG. 1B) has been removed from the lateral sides of the anode after lithium metal has been pre-electro-plated through the LiPON not covered by the mask 119 onto current collector 121 using a liquid electrolyte and a lithium sacrificial electrode.

In some embodiments, the soft polymer electrolyte layer 130 is spun on as a liquid and then dried. In other embodiments, the soft polymer electrolyte layer 130 is dip coated. In other embodiments, the soft polymer electrolyte layer 130 is cast on. In some embodiments, the soft polymer electrolyte layer 130 is deposited from a liquid source 225, "squeegeed" (by squeegee 221) and/or doctor-bladed (by doctor-blade 222) in place onto both sides of each foil-core double-sided anode sheet 121 (having previously had LiPON layer 124 and anode layer 122 formed thereon), and onto both sides of each foil-core double-sided cathode sheet 111 (having previously had cathode-material layer 112 and LiPON layer 114 formed thereon). In some embodiments, the soft polymer electrolyte layer 130 is deposited by an apparatus that is essentially an offset printing press, wherein a liquid soft polymer electrolyte material and/or solvent mix ("ink") is printed to the areas to which the soft polymer electrolyte layer 130 is desired.), and the stack is laminated together ("calendared" e.g., by being pressed between rollers 250 (for example, pressed between rubber-coated steel rollers, which, in some embodiments, are heated (e.g., by flowing hot oil inside the rollers)). Note that rollers 250 are schematically shown relative to two central battery layers, where In some embodiments, two or more such resulting stacks are then laminated together in a similar fashion. In other embodiments, all of the alternating layers of a battery device are laminated in a single pressing step.

FIG. 3 is a schematic cross-section view of a parallel-connected lithium battery 300 of some embodiments of the invention, resulting from the laminating method of FIG. 2. In some embodiments, the outermost layer 111 and the outermost layer 121 are single sided, having a metal face facing outwards. In other embodiments, all layers 111 are identical one to another (and each is mirror-symmetrical about the center plane of foil 110), and all layers 121 are identical one to another (and each is mirror-symmetrical about the center plane of foil 120). In some embodiments, the edges of layers 111 are electrically connected to one another (for example, soldered, spot-welded or pressed together on the right-hand side) to form external cathode current-collector contact 321, and the edges of layers 121 are electrically connected to one another (for example, soldered, spot-welded or pressed together on the left-hand side) to form external anode current-collector contact 322, thus connecting all the cells in parallel to provide higher output current. In some embodiments, 1- to 30-mA-hour (or more) single cells are thus formed (depending on the area of each cell), and the battery has an amp-hour capacity of about the sum of the parallel cells.

TABLE 2

Materials List for FIG. 3 - 1 repeat unit

|  | Material Thickness (microns) | Layer Mass (mg/cm$^2$) |
| --- | --- | --- |
| ½ cathode collector foil* | 1.5 and up (e.g., 6.25) | 4.94 |
| Nickel seed | 0.1 to 0.3 (e.g., 0.3) | 0.27 |
| LiCoO$_2$ | 0.5 to 10 (e.g., 5.0) | 2.80 |
| LiPON (cathode protect) | 0.1 to 2.5 (e.g., 1.0) | 0.21 |
| soft polymer electrolyte and/or "glue" | 0.5 to 10 (e.g., 5.0) | 0.75 |
| LiPON (anode protect) | 0.1 to 2.5 (e.g., 1.0) | 0.21 |
| Lithium (plated from LiCoO$_2$) | about 0.3 times the LiCoO$_2$ thickness (e.g., 1.5) | 0.08 |
| Copper (or Al, Ni, stainless steel, and the like) (used as the Li plate surface) | 0.1 to 1 (e.g., 0.25) | 0.22 |
| Anode collector foil | 3.0 and up (e.g., 12.5) | 9.88 |
| Copper (or Al, Ni, stainless steel, and the like) (used as the Li plate surface) | 0.1 to 1 (e.g., 0.25) | 0.22 |
| Lithium (plated from LiCoO$_2$) | about 0.3 times the LiCoO$_2$ thickness (e.g., 1.5) | 0.08 |
| LiPON (anode protect) | 0.1 to 2.5 (e.g., 1.0) | 0.21 |
| soft polymer electrolyte and/or "glue" | 0.5 to 10 (e.g., 5.0) | 0.75 |
| LiPON (cathode protect) | 0.1 to 2.5 (e.g., 1.0) | 0.21 |
| LiCoO$_2$ | 0.5 to 10.0 (e.g., 5.0) | 2.80 |
| Nickel seed | 0.1 to 0.3 (e.g., 0.3) | 0.27 |
| ½ cathode collector foil | 1.5 and up (e.g., 6.25) | 5.14 |
| Totals | (e.g., 53.1) | 28.84 |

*In some embodiments, the foils are about 0.5-mils (0.0005 inches = 12.52-microns) thick In some embodiments, the cathode material layers 112 are each about 10 microns thick or more. In some embodiments, 10 microns of LiCoO$_2$ provides about 0.552 mA-hour-per-square-cm per repeat unit 320 at 80% theoretical utilization, and 2.1 mW-hour-per-square-cm at 3.8-volt-discharge voltage. In some embodiments, the charge-storage density is about 104 mA-hour/cubic-cm, and about 19.1 Ahour/kg. In some embodiments, the energy-storage density is about 395 W-hour/liter, and about 72.8 W-hour/kg. In some embodiments, a 10-cm by 6.5-cm by one repeat unit 320 corresponds to 33.6 mA-hour, and about 127 mW-hour. In some embodiments, a final package measuring about 10.8-cm long by 6.5-cm wide by 1.8-cm thick houses three sets of 320 repeat units each, the sets tied in series to deliver 3.75 A-hour discharge from about 12.3 volts to about 9 volts.

Figure 4:
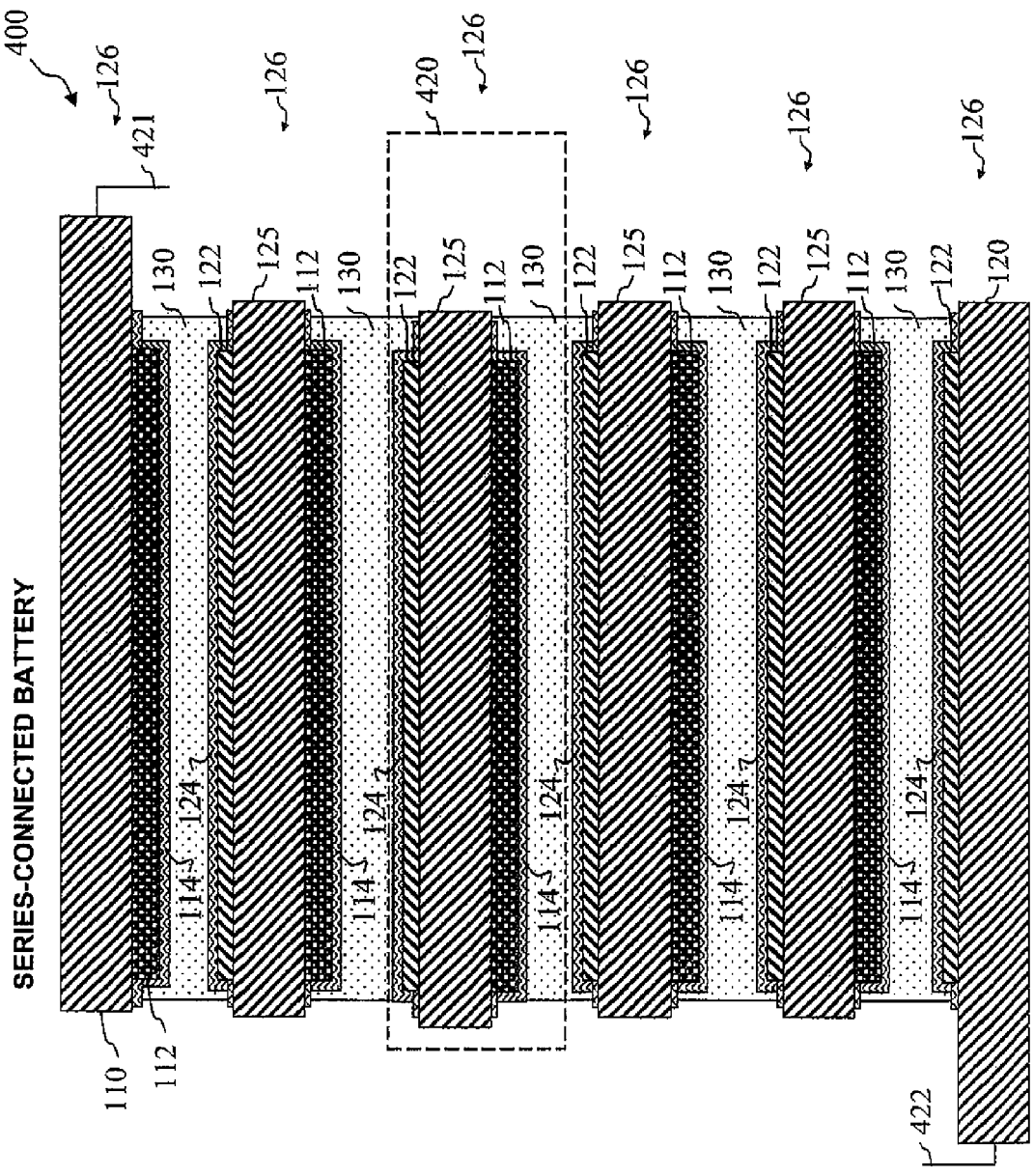
FIG. 4 is a schematic cross-section view of a series-connected lithium battery 400 of some embodiments of the invention.

FIG. 4 is a schematic cross-section view of a series-connected lithium battery 400 of some embodiments of the invention. In the embodiment shown, each sheet 126 has anode material covered with LiPON on one major face (the upper face in FIG. 4) of the foil 125, and cathode material covered with LiPON on the opposite major face (the lower face in FIG. 4). In some embodiments, the outermost layers are single sided as shown, having a metal face facing outwards. In other embodiments, all layers 125 are identical one to another, including the outermost layers. In some embodiments, the edge of the top-most layer 125 is electrically connected (for example, on the right-hand side) to form external cathode current-collector contact 421, and the edge of bottom-most layer 126 is electrically connected (for example, on the left-hand side) to form external anode current-collector contact 422, thus connecting all the cells in series. Each repeat unit 420 shows one basic stack layer. Up to one-A-hour or more single cells are thus formed, in some embodiments, depending on the area of each cell.

Figure 5A:
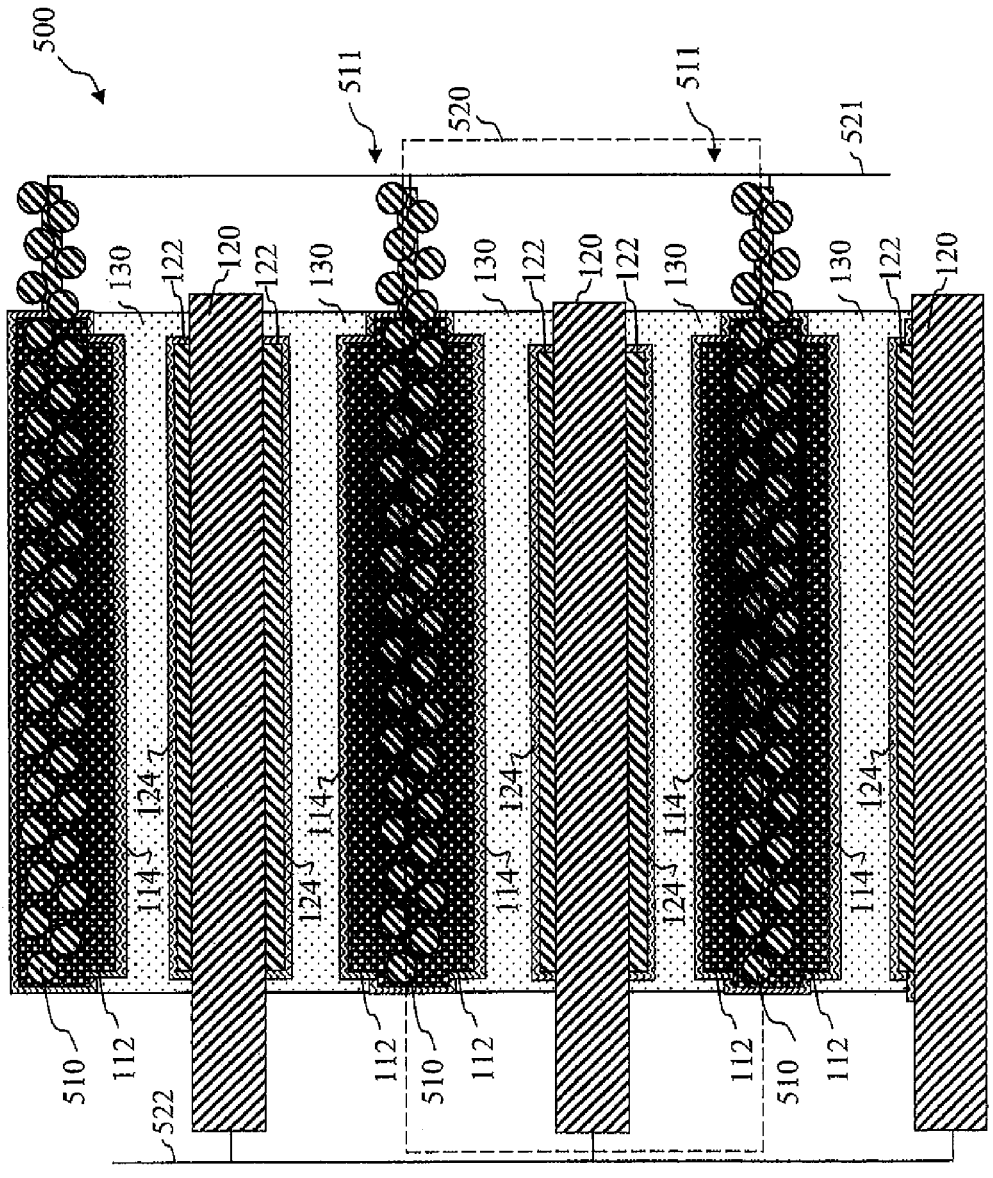
FIG. 5A is a schematic cross-section view of a parallel-connected screen-cathode current-collector contact lithium-battery 500 of some embodiments of the invention.

FIG. 5A is a schematic cross-section view of a parallel-connected screen-cathode-current-collector contact lithium-battery 500 of some embodiments of the invention. This embodiment is substantially similar to that of FIG. 3, except that, for the positive electrode, a metal screening or mesh 510 replaces foil 110. In some embodiments, this allows greater contact area to the cathode material 112, which is still completely covered by LiPON layer 114. In some embodiments, metal screening or mesh 510 is formed by selectively etching one or more photo-lithographically-defined areas of a metal foil. In some embodiments, $LiCoO_2$ is sputtered onto the metal screening 510. In other embodiments, a $LiCoO_2$ powder is packed onto the screening 510. In some embodiments, the $LiCoO_2$ (whether deposited by sputtering $LiCoO_2$ or by packing $LiCoO_2$ powder onto the screening 510) is infused with polyPN or other polymer electrolyte material to enhance the ionic conductivity within the cathode. In some embodiments, the screening 510 is initially (before depositing $LiCoO_2$) about 50% open space, and the open space is filled with $LiCoO_2$ and/or polyPN or other ionic-enhancement material.

In some embodiments, the metal screening or mesh 510 of all of the layers 511 are electrically connected to one another (for example, on the right-hand side) to form external cathode current-collector contact 521, and the edges of layers 120 are electrically connected to one another (for example, on the left-hand side) to form external anode current-collector contact 522, thus connecting all the cells in parallel. Each repeat unit 520 shows one basic stack layer.

TABLE 3

Materials List for FIG. 5A - 1 repeat unit

| | Material Thickness (microns) | Layer Mass ($mg/cm^2$) |
|---|---|---|
| ½ cathode collector screen/mesh/etched foil | 1.5 and up (e.g., 6.25) | 2.59 |
| $LiCoO_2$ (cathode) | 8.0 to 40 (e.g., 12.5) | 7.00 |
| LiPON (cathode protection and electrolyte) | 0.1 to 2.5 (e.g., 1.0) | 0.21 |
| soft polymer electrolyte and/or "glue" | 0.5 to 10 (e.g., 5.0) | 0.75 |
| LiPON (anode protection and electrolyte) | 0.1 to 2.5 (e.g., 1.0) | 0.21 |
| Lithium (plated from $LiCoO_2$) | about 0.3 times $LiCoO_2$ thickness (e.g., 5.0) | 0.265 |
| Copper (or Al, Ni, stainless steel, and the like) (used as the Li plate surface) | 0.1 to 1 (e.g., 0.25) | 0.22 |
| Anode collector foil | 3 and up (e.g., 12.5) | 9.88 |
| Copper (or Al, Ni, stainless steel, and the like) (used as the Li plate surface) | 0.1 to 1 (e.g., 0.25) | 0.22 |
| Lithium (plated from $LiCoO_2$) | about 0.3 times $LiCoO_2$ thickness (e.g., 5.0) | 0.265 |
| LiPON (anode protection and electrolyte) | 0.1 to 2.5 (e.g., 1.0) | 0.21 |
| soft polymer electrolyte and/or "glue" | 0.5 to 10 (e.g., 5.0) | 0.75 |
| LiPON (cathode protection and electrolyte) | 0.1 to 2.5 (e.g., 1.0) | 0.21 |

TABLE 3-continued

Materials List for FIG. 5A - 1 repeat unit

| | Material Thickness (microns) | Layer Mass ($mg/cm^2$) |
|---|---|---|
| $LiCoO_2$ (cathode) | 8.0 to 40 (e.g., 12.5) | 7.00 |
| ½ cathode collector screen/mesh/etched foil | 1.5 and up (e.g., 6.25) | 2.59 |
| Totals | (e.g., 74.5) | 32.37 |

In some embodiments, the cathode material layers include 31.25 microns $LiCoO_2$ in each repeat structure (50% of screen volume) at 80% packing, and 95% electrical utilization corresponds to 1.63 $mAhr/cm^2$/repeat unit, and 6.22 $mWhr/cm^2$/repeat unit at 3.8 V average discharge voltage. In some embodiments, the $LiCoO_2$ is infused with polyPN or other polymer electrolyte material to enhance the ionic conductivity within the cathode. In some embodiments, the charge storage density equals 218 $mAhr/cm^3$; and 50.35 Ahr/kg. In some embodiments, the energy storage density equals 835 Whr/liter, and 192 Whr/kg. In some embodiments, each 10 cm×6.5 cm×1 repeat unit corresponds to 106 mAhr; 404 mWhr. In some embodiments, a final package 10.8 cm×6.5 cm×1.8 cm houses three sets of 80 repeat units each tied in series to deliver 8.5 Ahr in discharge from 12.3 V to 9 V.

FIG. 5B is a schematic cross-section view of a series-connected screen-cathode-contact lithium-battery 501 of some embodiments of the invention. This embodiment is substantially similar to that of FIG. 4, except that a metal screening or mesh is laminated to the bottom side of foil 535 (a foil corresponding to foil 110 of FIG. 4), or the bottom side of foil 535 (starting with a foil 110 of FIG. 1A) is selectively etched only part-way through to form a foil top side and a bottom side that has a mesh-like quality. In some embodiments, this allows greater contact area to the cathode material 112, which is still completely covered by LiPON layer 114. In some embodiments, foil-mesh layer 535 is formed by selectively etching a photolithographically-defined areas of a metal foil, but not all the way through. In some embodiments, the outermost layers are single sided as shown, having a metal face facing outwards. In other embodiments, all layers 535 are identical one to another, including the outermost layers (wherein the electrode layers facing outwards are non-functioning). In some embodiments, the edge of the top-most layer 535 is electrically connected (for example, on the right-hand side) to form external cathode current-collector contact 531, and the edge of bottom-most layer 535 is electrically connected (for example, on the left-hand side) to form external anode current-collector contact 532, thus connecting all the cells in series. Each repeat unit 530 shows one basic stack layer.

In some embodiments, the thin (0.1 to 1.0 micron) LiPON electrolyte serves as a hard coating at the negative electrode preventing the formation of lithium dendrites. Its use as a coating at the positive electrode (i.e., $LiCoO_2$) doubly ensures that lithium plating at a defect site will not short the battery. At both electrodes, LiPON also provides an improvement in environmental resistance to water vapor and oxygen.

In some embodiments, the use of a relatively soft solid polymer electrolyte (SPE) simplifies the construction of cells over a full hard-electrolyte solid-state (e.g., LiPON only as the electrolyte) design. The soft polymer electrolyte functions as an "electrolyte glue" that allows the positive and negative electrodes to be constructed separately and adhered to each other later in the assembly process. In some embodiments, the soft polymer electrolyte is sprayed, squeegeed, or otherwise deposited in liquid form, and later solidified.

Without the LiPON coating, some embodiments using a soft polymer electrolyte would need sufficient soft polymer electrolyte thickness to have mechanical rigidity or mechanical strength, which reduces energy density and increases cell resistance. Without the soft polymer electrolyte ("electrolyte glue"), LiPON films would need to be perfect (defect free) over very large areas to achieve high-energy cells. The combination of the two electrolyte material systems eliminates shortcomings of either used alone.

Numerous metals can be used as the anode in battery cells of the present invention. One common anode metal is lithium. The lithium must be protected from oxygen and water vapor during manufacturing, assembly, and use of the battery. Zinc is another common anode metal used in some embodiments of the present invention. Zinc is the most electronegative metal that has good stability and corrosion resistance, with the appropriate inhibitor chemistry, in aqueous solutions. Several possible metal-air systems are listed in Table 4 along with a summary of their theoretical characteristics.

TABLE 4

Characteristics of metal-air cells. From "Handbook of Batteries, $3^{rd}$ Ed.;" David Linden and Thomas B. Reddy, Eds., Table 38.2, McGraw-Hill Handbooks, New York, 2002.
SUMMARY OF OTHER LITHIUM/AIR RESEARCH

| Metal anode | Electrochemical equivalent of metal, Ah/g | Theoretical cell voltage, *V | Valence change | Theoretical specific energy (of metal), kWh/kg | Practical operating voltage, V |
|---|---|---|---|---|---|
| Li | 3.86 | 3.4 | 1 | 13.0 | 2.4 |
| Ca | 1.34 | 3.4 | 2 | 4.6 | 2.0 |
| Mg | 2.20 | 3.1 | 2 | 6.8 | 1.2-1.4 |
| Al | 2.98 | 2.7 | 3 | 8.1 | 1.1-1.4 |
| Zn | 0.82 | 1.6 | 2 | 1.3 | 1.0-1.2 |
| Fe | 0.96 | 1.3 | 2 | 1.2 | 1.0 |

*Cell voltage with oxygen cathode

Lithium, the lightest alkali metal, has a unique place in battery systems. Its gravimetric electrochemical equivalence of 3.86 amp-hrs/g is the highest of any metallic anode material. It can be seen from Table 3 that lithium has the highest operational voltage and greatest theoretical specific energy of the metals listed. Using a lithium anode leads to a very light, high energy density battery. The difficulty with lithium technology is providing practical systems that operate in real world conditions. It is possible to construct lithium cells utilizing an aqueous electrolyte, but these cells have limited applicability due to corrosion of the lithium metal anode by water. The lithium anode may also corrode from contact with oxygen. A solution to the rapid corrosion of lithium metal anodes in lithium-air cells includes the use of LiPON as a protective barrier and separator in the structure of an organic-electrolyte lithium cell.

In some embodiments, a cell utilizes a LiPON thin film acting as both a portion of the electrolyte structure and a protective barrier against moisture and oxygen corrosion of the lithium metal anode. The structure of thin, flexible, lithium cells lends itself well to high-speed web-deposition processes, as described in U.S. Pat. No. 6,805,998 (which is incorporated herein by reference).

In some embodiments, a battery of the present invention (e.g., reference numbers 100, 300, 400, 500, 600 or 900) is incorporated in an electrical device such as a hearing aid, compass, cellular phone, tracking system, scanner, digital camera, portable computer, radio, compact disk player, cassette player, smart card, or other battery-powered device.

In some embodiments, the back (outside) of the cathode is exposed (or can be exposed, for example, by removing a protective polymer film layer) to air, such that oxygen acts as a cathode material. In some such embodiments, the air cathode battery is a primary battery that cannot be recharged, while in other embodiments, the air cathode battery is a secondary battery that can be recharged.

Other Embodiments of the Invention

One aspect of the invention includes an apparatus including a lithium anode covered by a LiPON electrolyte/protective layer, a lithium-intercalation-material cathode covered by a LiPON electrolyte/protective layer and a polymer electrolyte material sandwiched between the LiPON electrolyte/protective layer that covers the anode and the LiPON electrolyte/protective layer that covers the cathode.

In some embodiments, the cathode includes $LiCoO_2$.

In some embodiments of the invention, the anode overlays a copper-anode current-collector contact.

Another aspect of the invention includes a method including providing an anode substrate having a conductive anode-current-collector contact layer thereon, depositing a LiPON electrolyte/barrier layer over the anode-current-collector contact layer, providing a polymer electrolyte, and providing a cathode substrate having a cathode-current-collector contact layer, depositing a lithium intercalation material on the cathode current-collector contact layer, depositing a LiPON electrolyte/barrier layer over the cathode-current-collector contact layer, and forming a sandwich of the anode substrate and the cathode substrate with the polymer electrolyte therebetween. In some embodiments, a structure is provided having a plurality of anode substrates and a plurality of cathode substrates with polymer electrolyte between each pair of anode and cathode substrates.

Another aspect of the invention includes an apparatus that includes a substrate having an anode current-collector contact, a LiPON electrolyte separator deposited on the anode current-collector contact, and a plated layer of lithium anode material between the LiPON and the anode current-collector contact.

In some embodiments, the anode current-collector contact includes copper and the substrate includes a polymer.

Another aspect of the invention includes an apparatus including a deposition station that deposits LiPON onto an anode current-collector contact, a plating station that plates lithium onto the anode current-collector contact to form an anode substrate, a cathode-deposition station that deposits a cathode material onto a substrate and deposits LiPON onto the cathode material to form a cathode substrate, and an assembly station that assembles the anode substrate to the cathode substrate using a polymer electrolyte material sandwiched between the cathode substrate and the anode substrate.

In some embodiments of the invention, the deposition station comprises sputter deposition of LiPON.

In some embodiments, the LiPON is deposited onto the anode current-collector contact with a thickness of between about 0.1 microns and about 1 micron. In some embodiments, the anode's LiPON layer is less than 0.1 microns thick. In some embodiments, this LiPON layer is about 0.1 microns. In some embodiments, this LiPON layer is about 0.2 microns. In some embodiments, this LiPON layer is about 0.3 microns. In some embodiments, this LiPON layer is about 0.4 microns. In some embodiments, this LiPON layer is about 0.5 microns. In some embodiments, this LiPON layer is about 0.6 microns. In some embodiments, this LiPON layer is about 0.7 microns. In some embodiments, this LiPON layer is about 0.8 microns. In some embodiments, this LiPON layer is about 0.9 microns. In some embodiments, this LiPON layer is about 1.0 microns. In some embodiments, this LiPON layer is about 1.1 microns. In some embodiments, this LiPON layer is about 1.2 microns. In some embodiments, this LiPON layer is about 1.3 microns. In some embodiments, this LiPON layer is about 1.4 microns. In some embodiments, this LiPON layer is about 1.5 microns. In some embodiments, this LiPON layer is about 1.6 microns. In some embodiments, this LiPON layer is about 1.7 microns. In some embodiments, this LiPON layer is about 1.8 microns. In some embodiments, this LiPON layer is about 1.9 microns. In some embodiments, this LiPON layer is about 2.0 microns. In some embodiments, this LiPON layer is about 2.1 microns. In some embodiments, this LiPON layer is about 2.2 microns. In some embodiments, this LiPON layer is about 2.3 microns. In some embodiments, this LiPON layer is about 2.4 microns. In some embodiments, this LiPON layer is about 2.5 microns. In some embodiments, this LiPON layer is about 2.6 microns. In some embodiments, this LiPON layer is about 2.7 microns. In some embodiments, this LiPON layer is about 2.8 microns. In some embodiments, this LiPON layer is about 2.9 microns. In some embodiments, this LiPON layer is about 3 microns. In some embodiments, this LiPON layer is about 3.5 microns. In some embodiments, this LiPON layer is about 4 microns. In some embodiments, this LiPON layer is about 4.5 microns. In some embodiments, this LiPON layer is about 5 microns. In some embodiments, this LiPON layer is about 5.5 microns. In some embodiments, this LiPON layer is about 6 microns. In some embodiments, this LiPON layer is about 7 microns. In some embodiments, this LiPON layer is about 8 microns. In some embodiments, this LiPON layer is about 7 microns. In some embodiments, this LiPON layer is about 9 microns. In some embodiments, this LiPON layer is about 10 microns. In some embodiments, this LiPON layer is more than 10 microns.

In some embodiments, the LiPON is deposited onto the cathode current-collector contact with a thickness of between about 0.1 microns and about 1 micron. In some embodiments, the cathode's LiPON layer is less than 0.1 microns thick. In some embodiments, this UPON layer is about 0.1 microns. In some embodiments, this LiPON layer is about 0.2 microns. In some embodiments, this UPON layer is about 0.3 microns. In some embodiments, this LiPON layer is about 0.4 microns. In some embodiments, this LiPON layer is about 0.5 microns. In some embodiments, this LiPON layer is about 0.6 microns. In some embodiments, this LiPON layer is about 0.7 microns. In some embodiments, this LiPON layer is about 0.8 microns. In some embodiments, this LiPON layer is about 0.9 microns. In some embodiments, this LiPON layer is about 1.0 microns. In some embodiments, this LiPON layer is about 1.1 microns. In some embodiments, this LiPON layer is about 1.2 microns. In some embodiments, this LiPON layer is about 1.3 microns. In some embodiments, this LiPON layer is about 1.4 microns. In some embodiments, this LiPON layer is about 1.5 microns. In some embodiments, this LiPON layer is about 1.6 microns. In some embodiments, this UPON layer is about 1.7 microns. In some embodiments, this LiPON layer is about 1.8 microns. In some embodiments, this LiPON layer is about 1.9 microns. In some embodiments, this LiPON layer is about 2.0 microns. In some embodiments, this LiPON layer is about 2.1 microns. In some embodiments, this LiPON layer is about 2.2 microns. In some embodiments, this LiPON layer is about 2.3 microns. In some embodiments, this LiPON layer is about 2.4 microns. In some embodiments, this LiPON layer is about 2.5 microns. In some embodiments, this LiPON layer is about 2.6 microns. In some embodiments, this LiPON layer is about 2.7 microns. In some embodiments, this LiPON layer is about 2.8 microns. In some embodiments, this LiPON layer is about 2.9 microns. In some embodiments, this LiPON layer is about 3 microns. In some embodiments, this LiPON layer is about 3.5 microns. In some embodiments, this LiPON layer is about 4 microns. In some embodiments, this LiPON layer is about 4.5 microns. In some embodiments, this LiPON layer is about 5 microns. In some embodiments, this LiPON layer is about 5.5 microns. In some embodiments, this LiPON layer is about 6 microns. In some embodiments, this LiPON layer is about 7 microns. In some embodiments, this LiPON layer is about 8 microns. In some embodiments, this LiPON layer is about 7 microns. In some embodiments, this LiPON layer is about 9 microns. In some embodiments, this LiPON layer is about 10 microns. In some embodiments, this LiPON layer is more than 10 microns.

In some embodiments, the plating station performs electroplating at densities of about 0.9 mA/cm$^2$ and voltage of about 40 mV at 0.6 mA between a lithium counterelectrode and the plated lithium of the anode.

In some embodiments of the invention, during a precharge of the anode, the lithium is conducted through a liquid propylene carbonate/LiPF$_6$ (or other suitable lithium salt) electrolyte solution and the LiPON barrier/electrolyte layer for the lithium to be wet-bath plated onto the anode connector or conduction layer (e.g., copper foil or a copper layer on an SiO$_2$ or polymer substrate.

FIG. 6A is a perspective view of an electrode 600 having a hard-electrolyte-covered current collector with a plating mask 119. In some embodiments, a starting substrate such as 721 shown in FIG. 7B has its metal layer 720 (e.g., copper) photolithographically defined to form patterned metal layer 620 having contact pad 629, used for plating (such as shown in FIG. 6C) and for connecting to the external electrical conductor in the finished battery. In some embodiments, on top of patterned metal layer 620 is a patterned (e.g., photolithographically) hard electrolyte layer 624 (e.g., such as a hard electrolyte layer 124 described in FIG. 1C, but with some of its lateral edges removed). In some embodiments, an optional mask layer 119 is formed and/or patterned over the metal via between the main body of patterned metal layer 620 (which will be plated with lithium through patterned hard electrolyte layer 624 (e.g., LiPON)). In some embodiments, mask 119 prevents lithium from plating on the via, thus leaving sealed the interface between patterned hard electrolyte layer 624 and the metal via (otherwise, water vapor or air could cause the lithium plated in this area to corrode, leaving a gap that could cause more corrosion of the main body of the lithium on patterned metal layer 620. Because the patterned hard electrolyte layer 624 extends laterally beyond the lateral extent of patterned metal layer 620 on the rest of its periphery, no mask is required in those areas, since the lithium will not plate there and the sealed interface between patterned hard electrolyte layer 624 and the underlying non-conductive substrate remains intact and sealed.

FIG. 6B is a perspective view of another electrode 601 having a hard-electrolyte-covered current collector with a plating mask 119. In some embodiments such as shown here, the entire substrate surface is metal, so a mask 119 is deposited and/or patterned over the outer periphery of hard electrolyte layer 124 (e.g., LiPON), mask 119 with an interior opening 129 through which lithium will plate through the LiPON layer 124 to most of the central portion of the face of substrate 120 (e.g., a metal foil). In some embodiments, mask 119 is a photoresist layer that is patterned and left in place during plating. In other embodiments, mask 119 is another material (such as deposited SiO$_2$) that is patterned using photoresist, which is then removed. In still other embodiments, mask 119 is a material (such as SiO$_2$) that is deposited directly on the metal substrate 120, and is patterned using photoresist that is then removed before deposition of the hard electrolyte layer 124 (e.g., LiPON), thus preventing lithium from plating around the periphery (i.e., the mask 119 is under the LiPON, in some embodiments).

FIG. 6C is a perspective view of a plating system 610. In some embodiments, one or more electrodes 600 and/or electrodes 601 are partially or completely submerged in a liquid electrolyte 606 (e.g., propylene carbonate and/or ethylene carbonate with dissolved LiPF$_6$ or other suitable electrolyte). In some embodiments, a sacrificial block of lithium 605 is kept submerged in the electrolyte 606, and a suitable plating voltage is applied between the lithium block 605 and electrode(s) 600 and/or 601. In some embodiments, the contact pad 629 is kept out of the liquid to prevent lithium from plating there.

FIGS. 7A, 7B, 7C, 7D, 7E, and 7F are schematic cross-sectional views of the fabrication (shown as a series 700 of operations) of an atomic level matrix of copper and copper oxides as cathodes on a substrate of some embodiments of the invention. FIG. 7A shows a cross-section view of the starting substrate 710 (e.g., silicon, alumina, stainless steel, aluminum, or polymer, or a composite of different materials). In some embodiments, an aluminum-foil substrate (or other metal that could spontaneously alloy with lithium and thereby degrade performance of the battery) or an insulator or nonconductor (such as silicon or polymer, which does not conduct the electricity from the battery) is coated with copper or nickel (or other metal that conducts electricity and does not readily alloy with lithium and thereby helps maintain performance of the battery).

In some embodiments, a cathode starting material contains no lithium (e.g., a copper foil, screening, or insulator coated with a copper conduction layer, then coated with a high-surface area carbon or Cu$_x$O$_x$ (which has a high volumetric energy density) or other material useful as a lithium-battery electrode, optionally infused with polyPN). In some embodiments, (see FIG. 7B) a metal layer 720 (e.g., copper, nickel, or other suitable metal that does not readily alloy with lithium during charging or discharging of the battery) is deposited (e.g., by sputtering copper with no oxygen) on one or more major faces (e.g., the top and/or bottom surfaces shown in the figures) of a substrate 710 (e.g., a silicon wafer optionally having an SiO$_2$ insulation layer on one or both sides, an alumina or glass wafer, or a polymer film), to form a metal-coated substrate 721. In some embodiments, metal-coated substrate 721 can be used as the current collector base (rather than metal foil 111 or 121) for either the anode or cathode of any of the above-described embodiments.

In some embodiments, the starting substrate includes a plurality of metal layers (e.g., aluminum or copper moisture-barrier layers) alternating with a smoothing layer (e.g., spun-on photoresist or polyurethane) between each pair of metal layers to form a barrier stack (e.g., see U.S. patent application Ser. No. 11/031,217 filed Jan. 6, 2005, entitled "LAYERED BARRIER STRUCTURE HAVING ONE OR MORE DEFINABLE LAYERS AND METHOD", which is incorporated herein by reference), wherein the top-most metal layer of this stack is a metal that (unlike aluminum) does not readily alloy with lithium during battery charging or discharging (e.g., a metal such as copper). Such a moisture-barrier stack is particularly useful for sealing a substrate that transmits some moisture and/or oxygen over time (e.g., a polymer film substrate such as polyethylene or Kapton™), where the barrier stack.

For some embodiments using a lithium-free starting cathode, copper is then is sputtered in a partial O$_2$ atmosphere onto metal-coated substrate 721 (in some embodiments, the concentration of oxygen is increased over time such that the first material deposited is mostly copper, and gradually the material includes more and more oxygen in the copper-copper-oxide matrix) in argon (e.g., forming an atomic-scale mixture of copper, Cu$_4$O in layer 722 (see FIG. 7C), Cu$_2$O in layer 724 (see FIG. 7D), Cu$^+$O$^-$ and/or CuO in layer 728 (see FIG. 7E), or a succession of the copper substrate 720, then mostly Cu$_4$O in layer 722, then mostly Cu$_2$O in layer 724, then Cu$^+$O$^-$ and then CuO in layer 728 and/or an atomic-scale matrix of copper and copper oxides). In some embodiments, a layer of hard electrolyte 714 (see FIG. 7F), such as LiPON, is deposited across the finished cathode material.

FIGS. 8A, 8B, 8C, 8D, and 8E are schematic cross-sectional views of the fabrication (shown as a series 800 of operations) of an atomic level matrix of copper and copper oxides as cathodes on a copper-foil substrate of some embodiments of the invention. In some embodiments, (see FIG. 8A) a copper foil 711 or film is the starting material. In some embodiments, the starting foil is sputtered with argon to clean the surface(s) to be used for cathodes (e.g., the top and/or bottom surfaces shown), then copper is sputtered in a partial O$_2$ atmosphere (in some embodiments, the concentration of oxygen is increased over time such that the first material deposited is mostly copper, and gradually the material includes more and more oxygen in the copper-copper-oxide matrix) in argon (e.g., forming an atomic-scale mixture of copper, Cu$_4$O 722 (see FIG. 8B), Cu$_2$O 724 (see FIG. 8C), Cu$^+$O$^-$ and/or CuO 728 (see FIG. 8D), or a succession of the copper substrate 720, then mostly Cu$_4$O 722, then mostly Cu$_2$O 724, then Cu$^+$O$^-$ and then CuO 728 and/or an atomic-scale matrix of copper and copper oxides). In some embodiments, a layer of hard electrolyte 714 (see FIG. 8E) such as LiPON is deposited across the finished cathode material.

In some such embodiments, the copper metal spreads through the copper oxides (which intercalate lithium, in some embodiments), providing better electrical conductivity as the lithium migrates in and out of the cathode. In some embodiments, the anode is precharged by electroplating lithium through the LiPON electrolyte that has been deposited thereon.

In other embodiments, one or more copper oxides and/or copper powder are powder-pressed onto a copper substrate or screen (i.e., the cathode conduction layer). In still other embodiments, an ink, having one or more copper oxides and/or copper powder, is printed, sprayed, doctor-bladed, or otherwise deposited on the cathode conduction layer. In some embodiments of the invention, the cathode material is charged with lithium that is conducted through a liquid propylene carbonate/LiPF$_6$ electrolyte solution and the LiPON barrier/electrolyte layer for the lithium to be plated onto/into the cathode material and/or connector or conduction layer.

FIG. 9 is a schematic cross-section view of a parallel-connected foil-substrate-cathode -current-collector contact thin-film battery 900 of some embodiments of the invention. Battery 900 includes two cells connected in parallel, where two-sided anode current collector 120 has anode material 122 (e.g., lithium metal) that has been electroplated through hard electrolyte layers 124 (e.g., LiPON) on both sides of central current collector layer 120 (e.g., a metal foil or metal-coated polymer film), as defined by masks 119. In some embodiments, two cathode current collectors 110 each have cathode material 112 (e.g., LiCoO$_2$) deposited and photolithographically patterned and covered with hard electrolyte layers 124 (e.g., LiPON). Pinhole 992 in hard electrolyte layer 124 and/or pinhole 991 in hard electrolyte layer 124 would cause failures of a typical single-layer electrolyte battery, but in the present invention, the pinholes do not align (e.g., vertically in the figure) with one another, and, in some embodiments, are filled with the soft polymer electrolyte 130, which acts to fill such holes and automatically "heal" the battery. Other details of this battery are as described above for FIG. 3.

FIG. 10A is a schematic cross-section view of an encapsulated surface-mount single-cell micro-battery device 1000 of some embodiments of the invention (other embodiments use stacks of cells as described above). In some embodiments, a silicon wafer substrate has a plurality of such cells fabricated on it, and is diced apart to form silicon substrate 1011 having a metal current collector 1010 on its surface, which then has cathode material 112 and hard electrolyte layer 114 deposited thereon to form the cathode component. A foil anode component having foil substrate 120, anode metal 122, and hard electrolyte layer 124 is then laminated to the cathode component using a soft polymer electrolyte glue 130. This battery is then connected to a lead frame having cathode connector 1051 and anode connector 1052 and encapsulated in encapsulant material 1050, and the leads formed as gull-wing leads as shown or bent into J-shaped leads that curl under the package. Surface-mount-device 1000 can then be soldered to a circuit board to provide small amounts of battery power to other components on the circuit board (such as real-time clocks or timers, or static random-access memories, RFID circuits, and the like). In other embodiments, a plurality of foil battery cells is used instead and encapsulated to form a surface-mount chip-like battery having higher current and/or higher voltage capabilities.

FIG. 10B is a perspective view of the outside of encapsulated surface-mount micro-battery device 1000 (described above in FIG. 10A), of some embodiments of the invention. In some embodiments, a stack of foil battery cells (e.g., such as those described in FIG. 3, FIG. 4, FIG. 5A, and/or FIG. 5B, and, in some embodiments, with or without a silicon wafer substrate) is encapsulated in this form factor to create a surface-mount chip-like battery having higher current and/or higher voltage capabilities.

FIG. 11 is a flow chart of a method 1100 for making a battery cell according to some embodiments of the invention. In some embodiments, method 1100 includes providing 1110 a first sheet (e.g., 121) that includes an anode material and a hard electrolyte layer covering the anode material, providing 1112 a second sheet (e.g., 111) having a cathode material and a hard electrolyte layer covering the cathode material, and sandwiching 1114 a soft (e.g., polymer) electrolyte material between the hard electrolyte layer of the first sheet and the hard electrolyte layer of the second sheet. Some embodiments of the method 1100 further include the functions shown in FIG. 12.

FIG. 12 is a flow chart of a method 1200 for making a stacked battery according to some embodiments of the invention. In some embodiments, method 1200 includes performing 1210 the method 1100 of FIG. 11, providing 1212 a third sheet that includes an anode material and a hard electrolyte layer covering the anode material, providing a fourth sheet that includes a cathode material and a hard electrolyte layer covering the cathode material, sandwiching 1216 a polymer electrolyte material between the hard electrolyte layer covering the anode material of the third sheet and the hard electrolyte layer covering the cathode material of the fourth sheet, and between the hard electrolyte layer covering the anode material of the first sheet and the hard electrolyte layer covering the cathode material of the fourth sheet.

Figure 13:
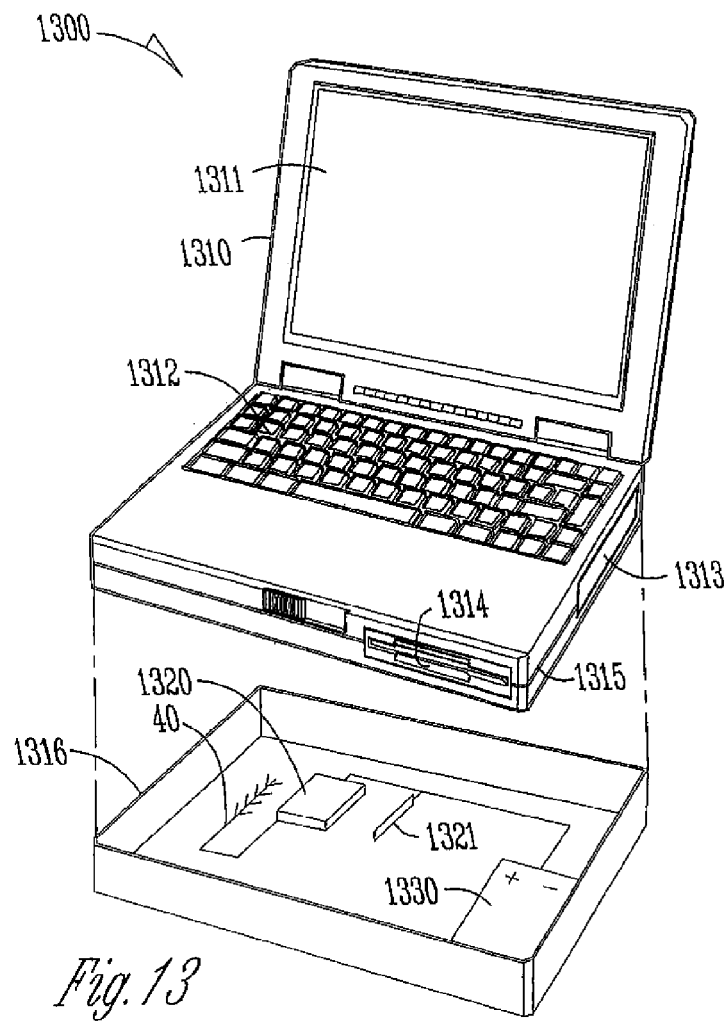
FIG. 13 is an exploded perspective view of an embodiment of a device as part of a system.

FIG. 13 is a perspective exploded view of information-processing system 1300 (such as a laptop computer) using battery device 1330 (which, in various embodiments, is any one or more of the battery devices described herein). For example, in various exemplary embodiments, information-processing system 1300 embodies a computer, workstation, server, supercomputer, cell phone, automobile, washing machine, multimedia entertainment system, or other device. In some embodiments, packaged circuit 1320 includes a computer processor that is connected to memory 1321, power supply (energy-storage device 1330), input system 1312 (such as a keyboard, mouse, and/or voice-recognition apparatus), input-output system 1313 (such as a CD or DVD read and/or write apparatus), input-output system 1314 (such as a diskette or other magnetic media read/write apparatus), output system 1311 (such as a display, printer, and/or audio output apparatus), wireless communication antenna 1340, and packaged within enclosure having a top shell 1310, middle shell 1315, and bottom shell 1316. In some embodiments, energy-storage device 1330 is deposited (e.g., as vapors forming thin-film layers in a vacuum deposition station) or laminated (as partially assembled electrode films) as thin-film layers directly on and substantially covering one or more surfaces of the enclosure (i.e., top shell 1310, middle shell 1315, and/or bottom shell 1316).

Figure 14:
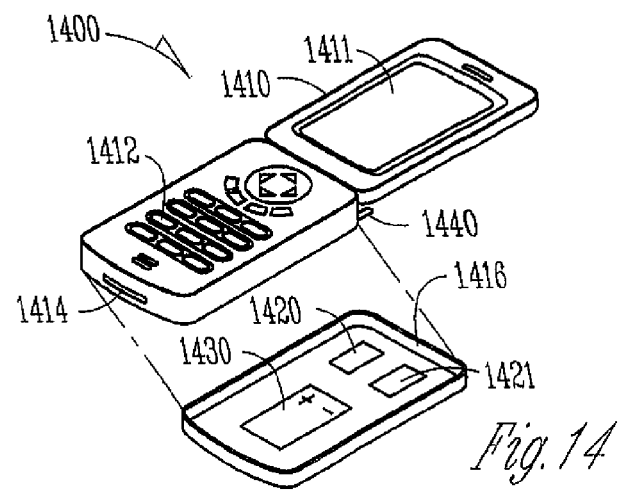
FIG. 14 is an exploded perspective view of another embodiment of a device as part of a portable system.

FIG. 14 shows an information-processing system 1400 having a similar configuration to that of FIG. 13. In various exemplary embodiments, information-processing system 1400 embodies a pocket computer, personal digital assistant (PDA) or organizer, pager, Blackberry™-type unit, cell phone, GPS system, digital camera, MP3 player-type entertainment system, and/or other device. In some embodiments, packaged circuit 1420 includes a computer processor that is connected to memory 1421, power-supply battery device 1430, input system 1412 (such as a keyboard, joystick, and/or voice-recognition apparatus), input/output system 1414 (such as a portable memory card connection or external interface), output system 1411 (such as a display, printer, and/or audio output apparatus), wireless communication antenna 1440, and packaged within enclosure having a top shell 1410 and bottom shell 1416. In some embodiments, battery device 1430 (which, in various embodiments, is any one or more of the battery devices described herein) is deposited as film layers directly on and substantially covering one or more surfaces of the enclosure (i.e., top shell 1410 and/or bottom shell 1416).

In some embodiments, at least one of the hard electrolyte layers is a glass-like layer that conducts lithium ions. In some such embodiments, at least one of the hard electrolyte layers includes LiPON. In some embodiments, the first hard electrolyte layer and the second hard electrolyte layer are both LiPON. In some such embodiments, each of the hard electrolyte layers is formed by sputtering from a LiPON source onto substrates having one or more electrode materials. In some such embodiments, each of the hard electrolyte layers is formed by sputtering from a lithium phosphate source in a nitrogen atmosphere onto substrates having one or more electrode materials. In some embodiments, each of the hard electrolyte layers is formed by sputtering from a lithium phosphate source in a nitrogen atmosphere, using an ion-assist voltage, onto substrates having one or more electrode materials.

In some embodiments, the soft electrolyte layer includes one or more polymers having a gel-like consistency at room temperatures.

In some embodiments, the soft layer includes a polyphosphazene polymer. In some such embodiments, the soft layer includes co-substituted linear polyphosphazene polymers. In some such embodiments, the soft layer includes polyphosphazene polymers having a gel-like consistency at room temperatures. In some such embodiments, the soft layer includes MEEP (poly[bis(2-(T-methoxyethoxy) ethoxy)phosphazene]).

In some embodiments, the soft-electrolyte layer is formed by depositing soft-electrolyte material onto the hard-electrolyte layer on the positive electrode, depositing soft-electrolyte material onto the hard-electrolyte layer on the negative electrode, and pressing the soft-electrolyte material on the positive electrode and the soft-electrolyte material on the negative electrode against each other.

In some embodiments, the soft layer includes a polymer matrix infused with a liquid and/or gel electrolyte material (e.g., polyPN). In some such embodiments, the polymer matrix is formed by waffle embossing (micro-embossing to leave raised structures, e.g., about 0.1 microns high to about 5 microns high: in some embodiments, about 0.1 microns, about 0.2 microns, about 0.3 microns, about 0.4 microns, about 0.5 microns, about 0.6 microns, about 0.7 microns, about 0.8 microns, about 0.9 microns, about 1.0 microns, about 1.2 microns, about 1.4 microns, about 1.6 microns, about 1.8 microns, about 2.0 microns, about 2.2 microns, about 2.4 microns, about 2.6 microns, about 2.8 microns, about 3.0 microns, about 3.5 microns, about 4 microns, about 4.5 microns, about 5 microns, about 6 microns, about 7 microns, about 8 microns, about 9 microns, or about 10 microns high) a heated polymer material onto at least one of the positive electrode and the negative electrode. In some such embodiments, the waffle embossing forms a pattern of dots. In some such embodiments, the waffle embossing forms a pattern of lines. In some such embodiments, the waffle embossing forms a two-directional/two-dimensional pattern of lines (e.g., in some embodiments, intersecting lines forming squares, triangles, hexagons, and/or the like, while in other embodiments, non-intersecting geometric patterns such as circles, squares, triangles, and/or the like). In other embodiments, a one-directional pattern of lines is microembossed in one direction on the positive electrode and in another direction on the negative electrode.

In some embodiments, the soft electrolyte layer includes a thin (e.g., 0.5 to 5.0 microns thick) polymer sponge or screen (e.g., a polypropylene sponge) infused with a liquid and/or gel electrolyte material (e.g., polyPN) and placed between the two hard electrolyte layers.

In some such embodiments, the soft-electrolyte layer is formed by depositing a thin soft-electrolyte layer onto the hard electrolyte layer on the positive electrode, depositing a thin soft-electrolyte layer onto the hard electrolyte layer on the negative electrode, and pressing the soft electrolyte layer on the positive electrode and the soft electrolyte layer on the negative electrode against each other. In some such embodiments, at least one of the thin soft-electrolyte layers is formed by doctor blading. In some such embodiments, at least one of the thin soft-electrolyte layers is formed by spraying. In some such embodiments, at least one of the thin soft-electrolyte layers is formed by silk-screening. In some such embodiments, at least one of the thin soft-electrolyte layers is formed by printing.

In some embodiments, the battery includes a positive electrode that includes a $LiCoO_2$ layer deposited on a copper current-collector layer, about 1 micron of LiPON deposited on the $LiCoO_2$ layer, a layer of between about 1 micron and three microns of polyphosphazene/lithium-salt electrolyte material, and about 1 micron of LiPON on the negative electrode. In some embodiments, the negative electrode includes a copper current collector onto which LiPON is deposited and that is precharged by wet plating lithium onto the copper current collector through the LiPON layer. In some embodiments, the layer of polyphosphazene/lithium-salt electrolyte material is formed by depositing about 1 micron of polyphosphazene/lithium-salt electrolyte material on the LiPON deposited on the positive electrode, depositing about 1 micron of polyphosphazene/lithium-salt electrolyte material on the LiPON on the negative electrode and contacting the polyphosphazene/lithium-salt electrolyte material on the positive electrode to the polyphosphazene/lithium-salt electrolyte material on the negative electrode. In some such embodiments, the contacting includes pressing between rollers.

Some embodiments of the invention include an apparatus that includes a battery cell having a positive electrode, a negative electrode, and an electrolyte structure therebetween, wherein the electrolyte structure includes a soft electrolyte layer and at least one hard electrolyte layer.

In some embodiments, the electrolyte structure includes a hard electrolyte layer on the negative electrode, and the soft electrolyte layer is sandwiched between the positive electrode and the hard electrolyte layer on the negative electrode. In some such embodiments, the invention omits the hard electrolyte covering on the positive electrode.

In some embodiments, the soft electrolyte layer includes a polyphosphazene. In some embodiments, the soft electrolyte layer includes MEEP. In some embodiments, the soft electrolyte layer also includes a metal salt, such as $LiPF_6$, $LiBF_4$, $LiCF_3SO_4$, $CF_3SO_3Li$ (lithium trifluoromethanesulfonate, also called triflate), lithium bisperfluoroethanesulfonimide, lithium (Bis) Trifluoromethanesulfonimide, or the like or a mixture or two or more such salts, for example.

In some embodiments, the electrolyte structure includes a hard electrolyte layer on the positive electrode and a hard electrolyte layer on the negative electrode, and the soft electrolyte layer is sandwiched between the hard electrolyte layer on the positive electrode and the hard electrolyte layer on the negative electrode. In some embodiments, the thicknesses of the hard electrolyte layer on the positive electrode and of the hard electrolyte layer on the negative electrode are each about one micron or less. In some embodiments, the thicknesses of the hard electrolyte layer on the positive electrode and of the hard electrolyte layer on the negative electrode are each about 0.5 microns or less. In some embodiments, the thickness of the soft electrolyte layer is about three microns or less. In some embodiments, the thickness of the soft electrolyte layer is about two microns or less. In some embodiments, the thickness of the soft electrolyte layer is about one micron or less.

In some embodiments, the hard electrolyte layer on the positive electrode includes is substantially the same material as the hard electrolyte layer on the negative electrode. In some embodiments, the hard electrolyte layer on the positive electrode includes is substantially the same thickness as the hard electrolyte layer on the negative electrode.

In some embodiments, the hard electrolyte layer on the positive electrode includes LiPON and the hard electrolyte layer on the negative electrode includes UPON.

In some embodiments, the soft electrolyte layer includes a gel.

In some embodiments, the soft electrolyte layer includes a gel that includes a polyvinylidene difluoride (PVdF), propylene carbonate, and a lithium salt. PVdF is a polymer that does not conduct lithium ions, that is, lithium salts will not dissolve in PVdF. However, PVdF can be swollen with a liquid such as propylene carbonate in which a lithium salt has been dissolved. The gel that results can be used as a soft electrolyte.

Some embodiments further include an encapsulating material surrounding the battery cell, and one or more electrical leads connecting from the battery cell to an exterior of the encapsulating material.

Some embodiments further include an electronic device and a housing holding the electrical device, wherein the battery cell is within the housing and supplies power to the electronic device.

Some embodiments of the invention include a method that includes providing a positive electrode component, providing a negative electrode component, coating at least the negative electrode component with a hard electrolyte layer, and forming a battery cell using the positive electrode component, the negative electrode component that is coated with the hard electrolyte layer, and a soft electrolyte layer in between.

Some embodiments of the method further include coating the positive electrode component with a hard electrolyte layer, wherein an electrolyte structure of the battery cell includes the hard electrolyte layer on the negative electrode, the hard electrolyte layer on the positive electrode, and the soft electrolyte layer which is sandwiched between the hard electrolyte layer on the positive electrode and the hard electrolyte layer on the negative electrode.

In some embodiments of the method, the electrolyte structure includes a hard electrolyte layer on the positive electrode and a hard electrolyte layer on the negative electrode, and the soft electrolyte layer is sandwiched between the hard electrolyte layer on the positive electrode and the hard electrolyte layer on the negative electrode.

In some embodiments of the method, the hard electrolyte layer on the positive electrode includes LiPON and the hard electrolyte layer on the negative electrode includes LiPON.

In some embodiments of the method, the soft electrolyte layer includes a polyphosphazene and a lithium salt. In some embodiments, the soft electrolyte layer includes MEEP and a lithium salt. In some embodiments, the lithium salt includes LiPF6, LiBF4, LiCF3SO4, CF3SO3Li (lithium trifluoromethanesulfonate, also called triflate), lithium bisperfluoroethanesulfonimide, lithium (Bis) Trifluoromethanesulfonimide, or the like or a mixture or two or more such salts, for example.

Some embodiments of the invention include an apparatus that includes a positive electrode component coated with a hard electrolyte layer, a negative electrode component coated with a hard electrolyte layer, and electrolyte means for connecting the hard electrolyte layer on the negative electrode component to the hard electrolyte layer on the positive electrode component to form a battery cell.

In some embodiments, the means for connecting further includes means for fixing defects in one or more of the hard electrolyte layers.

In some embodiments, the hard electrolyte layer on the positive electrode includes LiPON and the hard electrolyte layer on the negative electrode includes LiPON.

In some embodiments, the means for connecting includes MEEP. In some embodiments, the means for connecting includes a polyphosphazene and a lithium salt. In some embodiments, the means for connecting includes MEEP and a lithium salt. In some embodiments, the lithium salt includes LiPF6, LiBF4, LiCF3SO4, CF3SO3Li (lithium trifluoromethanesulfonate, also called triflate), lithium bisperfluoroethanesulfonimide, lithium (Bis) Trifluoromethanesulfonimide, or the like or a mixture or two or more such salts, for example.

Some embodiments further include an encapsulating material surrounding the battery cell, and one or more electrical leads connecting from the battery cell to an exterior of the encapsulating material.

Some embodiments further include an electronic device, wherein the battery cell supplies power to at least a portion of the electronic device.

Some embodiments of the invention include an apparatus that includes a first battery cell having a negative electrode, a positive electrode, and an electrolyte structure, wherein the negative electrode includes an anode material and a LiPON layer covering at least a portion of the negative electrode, the positive electrode includes a cathode material and a UPON layer covering at least a portion of the positive electrode, and the electrolyte structure includes a polymer electrolyte material sandwiched between the LiPON layer of the negative electrode and the LiPON layer of the positive electrode.

In some embodiments, the cathode material includes LiCoO2 that is deposited on a positive electrode current-collector material, and the LiPON layer of the positive electrode is deposited on the LiCoO2. In some such embodiments, the positive electrode current-collector contact material includes a metal mesh around which the cathode material is deposited.

In some embodiments, the negative electrode includes a negative-electrode current collector made of a metal that does not readily alloy with lithium during a plating operation, and lithium metal is plated onto the negative-electrode current collector through the LiPON layer covering the negative electrode. In some such embodiments, the metal of the negative-electrode current collector includes copper. In some such embodiments, the negative electrode includes a mask layer covers a periphery of the negative-electrode current collector and lithium metal is plated through the LiPON layer covering the negative electrode onto an area of the metal negative-electrode current collector defined by the mask.

In some embodiments, the negative electrode includes a current-collector metal layer, and the anode material includes lithium metal deposited on at least one of two major faces of the metal layer that is at least partially covered by the LiPON layer of the negative electrode.

In some embodiments, the anode material is deposited on both major faces of the metal layer of the negative electrode, each face at least partially covered by the LiPON layer of the negative electrode.

In some embodiments, the positive electrode includes a current-collector metal layer, and the cathode material is deposited on both major faces of the metal layer and is at least partially covered by the LiPON layer.

In some embodiments, the negative electrode includes a current-collector metal layer, and the anode material includes lithium metal plated onto both major faces of the negative-electrode current-collector metal layer through the LiPON layer covering the negative electrode.

In some embodiments, the negative electrode includes a current-collector contact foil coated with the LiPON layer of the negative electrode, the lithium anode material includes lithium metal plated onto a first major face of the current-collector contact foil through the LiPON layer covering the current-collector contact foil, the lithium cathode material of a second battery cell is deposited onto a second major face of the current-collector contact foil of the negative electrode of the first battery cell, and the LiPON barrier/electrolyte layer covering the cathode material of the second battery cell is then deposited by sputtering.

In some embodiments, the positive electrode includes a current-collector foil, the lithium cathode material is deposited onto both major faces of the positive electrode current-collector contact foil, and the LiPON barrier/electrolyte layer covering the positive electrode is then deposited by sputtering.

In some embodiments, the positive electrode includes a current-collector contact mesh, the lithium cathode material is deposited onto both major faces of the cathode current-collector contact mesh, and the LiPON barrier/electrolyte layer covering the positive electrode is then deposited by sputtering.

Some embodiments of the invention include a method that includes providing a first sheet that includes an anode material and a LiPON barrier/electrolyte layer covering the anode material, providing a second sheet that includes a cathode material that includes lithium and a LiPON barrier/electrolyte layer covering the cathode material, and sandwiching a polymer electrolyte material between the LiPON barrier/electrolyte layer covering the anode material of the first sheet and the LiPON barrier/electrolyte layer covering the cathode material of the first cathode sheet.

Some embodiments of the method further include providing a third sheet that includes an anode material and a LiPON barrier/electrolyte layer covering the anode material, providing a fourth sheet that includes a cathode material that includes lithium and a LiPON barrier/electrolyte layer covering the cathode material, sandwiching a polymer electrolyte material between the LiPON barrier/electrolyte layer covering the anode material of the third sheet and the LiPON barrier/electrolyte layer covering the cathode material of the fourth sheet, and sandwiching a polymer electrolyte material between the LiPON barrier/electrolyte layer covering the anode material of the first sheet and the LiPON barrier/electrolyte layer covering the cathode material of the fourth sheet.

In some embodiments of the method, the anode is deposited as a layer on a copper anode current-collector contact layer through a LiPON layer.

In some embodiments of the method, the deposition of a lithium anode is done by electroplating in a propylene carbonate/LiPF6 electrolyte solution.

In some embodiments of the method, the first sheet includes a cathode material on a face opposite the anode material and a LiPON barrier/electrolyte layer covering the cathode material, and the second sheet includes an anode material that includes lithium on a face opposite the cathode material and a LiPON barrier/electrolyte layer covering the anode material, wherein the method further includes providing a third sheet that includes an anode material that includes lithium and a LiPON barrier/electrolyte layer covering the anode material on a first face, and an anode material that includes lithium and a LiPON barrier/electrolyte layer covering the anode material on a second face opposite the first face, and sandwiching a polymer electrolyte material between the UPON barrier/electrolyte layer covering the anode material of the first sheet and the LiPON barrier/electrolyte layer covering the cathode material of the third sheet.

Some embodiments of the invention include an apparatus that includes a first sheet that includes an anode material that includes lithium and a LiPON barrier/electrolyte layer covering the anode material on a first face of the first sheet, a second sheet that includes a cathode material that includes lithium and a LiPON barrier/electrolyte layer covering the cathode material on a second face of the second sheet, and means for passing ions between the LiPON layer on the first face of the first sheet and the LiPON layer on the second face of the second sheet to form a first battery cell.

In some embodiments, the first sheet includes a LiPON layer on a second face of the first sheet, and the apparatus further includes a third sheet that includes an anode material that includes lithium and a LiPON barrier/electrolyte layer covering the anode material on a first face of the third sheet, a fourth sheet that includes a cathode material that includes lithium and a LiPON barrier/electrolyte layer covering the cathode material on a second face of the fourth sheet and a cathode material that includes lithium and a LiPON barrier/electrolyte layer covering the cathode material on a first face of the fourth sheet, means for passing ions between the LiPON layer on the first face of the third sheet and the LiPON layer on the second face of the fourth sheet to form a second battery cell, and means for passing ions between the LiPON layer on the second face of the first sheet and the LiPON layer on the first face of the fourth sheet to form a third battery cell.

In some embodiments, the first sheet includes a copper anode current-collector layer, and the anode material includes lithium deposited as a lithium-metal layer on the copper anode current-collector layer through the LiPON layer of the first sheet.

In some embodiments, a periphery of the lithium-metal layer is defined by a mask, and the deposition of a lithium anode is done by electroplating in a liquid propylene carbonate/LiPF6 electrolyte solution.

In some embodiments, the first sheet includes a cathode material on a second face opposite the anode material on the first face and a LiPON barrier/electrolyte layer covering the cathode material of the first sheet, and the apparatus further includes a third sheet having an anode material that includes lithium and a LiPON barrier/electrolyte layer covering the anode material on a first face of the third sheet, and means for passing ions between the LiPON layer on the second face of the first sheet and the LiPON layer on the first face of the third sheet to form a series-connected pair of battery cells.

Some embodiments of the invention include an apparatus that includes a deposition station that deposits a hard electrolyte layer on a negative electrode component, a deposition station that deposits a hard electrolyte layer on a positive electrode component, and a lamination station that laminates the hard electrolyte layer on the negative electrode component to the hard electrolyte layer on the positive electrode component with a soft electrolyte layer therebetween to form a composite electrolyte structure.

Some embodiments further include a deposition station that deposits a soft electrolyte layer on the hard electrolyte layer on the negative electrode component. In some embodiments, the soft electrolyte layer includes a polyphosphazene.

Some embodiments further include a deposition station that deposits a soft electrolyte layer on the hard electrolyte layer on the negative electrode component, and a deposition station that deposits a soft electrolyte layer on the hard electrolyte layer on the positive electrode component.

In some embodiments, the deposition station that deposits the hard electrolyte layer on the positive electrode deposits a material that includes LiPON, the deposition station that deposits the hard electrolyte layer on the negative electrode component deposits a material that includes LiPON, and the deposition station that deposits the soft electrolyte layer deposited on the hard electrolyte layer on the positive electrode component and the deposition station that deposits the soft electrolyte layer on the hard electrolyte layer on the negative electrode deposits a material that includes a polyphosphazene and a lithium salt. In some embodiments, the soft electrolyte layer includes MEEP.

In some embodiments, the deposition station that deposits the hard electrolyte layer on the positive electrode deposits a material that includes LiPON and the deposition station that deposits the hard electrolyte layer on the negative electrode deposits a material that includes LIPON.

Some embodiments further include a deposition station that deposits a LiCoO2 layer on the positive electrode before the hard electrolyte layer is deposited on the positive electrode component.

Some embodiments further include an electroplating station that plates a lithium metal layer on the negative electrode through the hard electrolyte layer after the hard electrolyte layer is deposited on the negative electrode component.

Some embodiments further include a patterning station that deposits a photoresist layer and patterns a mask that defines an area on the negative electrode component to which a lithium metal layer can be formed.

Some embodiments of the invention include a method that includes providing a positive electrode component, providing a negative electrode component, depositing a hard electrolyte layer on the negative electrode component, depositing a hard electrolyte layer on a positive electrode component, and laminating the hard electrolyte layer on the negative electrode to the hard electrolyte layer on the positive electrode with a soft electrolyte layer therebetween to form a composite electrolyte structure.

In some embodiments of the method, the depositing of the hard electrolyte layer on the positive electrode component includes sputtering a LiPON layer, and the depositing of the hard electrolyte layer on the negative electrode component includes sputtering a LiPON layer.

In some embodiments of the method, the soft electrolyte layer includes a polyphosphazene and a lithium salt.

Some embodiments further include depositing a soft electrolyte layer on the hard electrolyte layer on the negative electrode component, and depositing a soft electrolyte layer on the hard electrolyte layer on a positive electrode component, and wherein the laminating presses the soft electrolyte layer on the hard electrolyte layer on the negative electrode component against the soft electrolyte layer on the hard electrolyte layer on the positive electrode component.

In some embodiments, the depositing of the soft electrolyte layer on the hard electrolyte layer on the negative electrode component includes doctor blading.

In some embodiments, the depositing of the soft electrolyte layer on the hard electrolyte layer on the negative electrode component includes spraying soft electrolyte material in a liquid form.

In some embodiments, the depositing of the soft electrolyte layer on the hard electrolyte layer on the positive electrode component includes spin coating soft electrolyte material in a liquid form.

Some embodiments of the invention include an apparatus that includes a source of a positive electrode component, a source of a negative electrode component, means for depositing a hard electrolyte layer on the negative electrode component, means for depositing a hard electrolyte layer on a positive electrode component, and means for laminating the hard electrolyte layer on the negative electrode to the hard electrolyte layer on the positive electrode with a soft electrolyte layer therebetween to form a composite electrolyte structure.

Some embodiments further include means for depositing a soft electrolyte layer on the hard electrolyte layer on the negative electrode component, and means for depositing a soft electrolyte layer on the hard electrolyte layer on a positive electrode component, and wherein the means for laminating presses the soft electrolyte layer on the hard electrolyte layer on the negative electrode component against the soft electrolyte layer on the hard electrolyte layer on the positive electrode component.

In some embodiments, the hard electrolyte layer deposited on the positive electrode component includes LiPON and the hard electrolyte layer deposited on the negative electrode component includes LiPON.

In some embodiments, the soft electrolyte layers include a polyphosphazene and a lithium salt.

In some embodiments, the soft electrolyte layers include MEEP.

Some embodiments of the invention include an apparatus that includes a battery cell having an anode, a cathode, and an electrolyte structure, wherein the anode includes an anode material that, when the battery cell is charged, includes lithium and a LiPON barrier/electrolyte layer covering at least a portion of the anode, the cathode includes a cathode material that includes lithium and a LiPON barrier/electrolyte layer covering at least a portion of the cathode, and the electrolyte structure includes a polymer electrolyte material sandwiched between the LiPON barrier/electrolyte layer covering the anode and the LiPON barrier/electrolyte layer covering the cathode.

In some embodiments of the apparatus, the cathode material includes $LiCoO_2$ deposited on a cathode-current-collector contact material, and then the LiPON barrier/electrolyte layer covering the cathode is deposited.

In some embodiments of the apparatus, the cathode material includes $LiCoO_3$ deposited on a cathode-current-collector contact material, and then the UPON barrier/electrolyte layer covering the cathode is deposited.

In some embodiments of the apparatus, the lithium anode material is plated onto a copper anode current-collector contact or current collector through LiPON barrier/electrolyte layer covering the anode.

In some embodiments of the apparatus, the anode material is deposited on both major faces of a metal sheet at least partially covered by the LiPON barrier/electrolyte layer.

In some embodiments of the apparatus, the cathode material is deposited on both major faces of a metal sheet and is at least partially covered by the LiPON barrier/electrolyte layer.

In some embodiments of the apparatus, the cathode current-collector contact material includes a metal mesh around which the cathode material is deposited.

In some embodiments of the apparatus, the lithium anode material is plated onto both major faces of an anode current-collector contact foil through LiPON barrier/electrolyte layer covering the anode current-collector contact layer.

In some embodiments of the apparatus, the lithium anode material is plated onto a first major face of a current-collector contact foil through LiPON barrier/electrolyte layer covering the current-collector contact foil the lithium cathode material is deposited onto a second major face of the current-collector contact foil, and the LiPON barrier/electrolyte layer covering the cathode is then deposited by sputtering.

In some embodiments of the apparatus, the lithium cathode material is deposited onto both major faces of a cathode current-collector contact foil, and the LiPON barrier/electrolyte layer covering the cathode is then deposited by sputtering.

In some embodiments of the apparatus, the lithium cathode material is deposited onto both major faces of a cathode current-collector contact mesh, and the LiPON barrier/electrolyte layer covering the cathode is then deposited by sputtering.

In some embodiments, another aspect of the invention includes a method that includes providing a first sheet that includes an anode material that includes lithium and a LiPON barrier/electrolyte layer covering the anode material, providing a second sheet that includes a cathode material that includes lithium and a LiPON barrier/electrolyte layer covering the cathode material, and sandwiching a polymer electrolyte material between the LiPON barrier/electrolyte layer covering the anode material of the first sheet and the LiPON barrier/electrolyte layer covering the cathode material of the second sheet.

Some embodiments of the method further include providing a third sheet that includes an anode material that includes lithium and a LiPON barrier/electrolyte layer covering the anode material, providing a fourth sheet that includes a cathode material that includes lithium and a LiPON barrier/electrolyte layer covering the cathode material, sandwiching a polymer electrolyte material between the LiPON barrier/electrolyte layer covering the anode material of the third sheet and the UPON barrier/electrolyte layer covering the cathode material of the fourth sheet, and sandwiching a polymer electrolyte material between the LiPON barrier/electrolyte layer covering the anode material of the first sheet and the LiPON barrier/electrolyte layer covering the cathode material of the fourth sheet.

In some embodiments of the method, the anode is deposited as a layer on a copper anode current-collector contact layer through a LiPON layer.

In some embodiments of the method, the deposition of a lithium anode is done by electroplating in a propylene carbonate/LiPF$_6$ electrolyte solution.

In some embodiments of the method, the first sheet includes a cathode material on a face opposite the anode material and a LiPON barrier/electrolyte layer covering the cathode material, and the second sheet includes an anode material that includes lithium on a face opposite the cathode material on the second sheet and a LiPON barrier/electrolyte layer covering the anode material, and the method further includes providing a third sheet that includes an anode material that includes lithium and a LiPON barrier/electrolyte layer covering the anode material on a first face, and an anode material that includes lithium and a LiPON barrier/electrolyte layer covering the anode material on a second face opposite the first face, and sandwiching a polymer electrolyte material between the LiPON barrier/electrolyte layer covering the anode material of the first sheet and the LiPON barrier/electrolyte layer covering the cathode material of the third sheet.

In some embodiments, another aspect of the invention includes an apparatus that includes a first sheet that includes an anode material that includes lithium and a LiPON barrier/electrolyte layer covering the anode material, a second sheet that includes a cathode material that includes lithium and a LiPON barrier/electrolyte layer covering the cathode material, and means for sandwiching a polymer electrolyte material between the LiPON barrier/electrolyte layer covering the anode material of the first sheet and the LiPON barrier/electrolyte layer covering the cathode material of the second sheet.

Some embodiments of this apparatus include a third sheet that includes an anode material that includes lithium and a LiPON barrier/electrolyte layer covering the anode material, a fourth sheet that includes a cathode material that includes lithium and a LiPON barrier/electrolyte layer covering the cathode material, means for sandwiching a polymer electrolyte material between the LiPON barrier/electrolyte layer covering the anode material of the third sheet and the LiPON barrier/electrolyte layer covering the cathode material of the fourth sheet, and means for sandwiching a polymer electrolyte material between the LiPON barrier/electrolyte layer covering the anode material of the first sheet and the LiPON barrier/electrolyte layer covering the cathode material of the fourth sheet.

In some embodiments, the first sheet includes a cathode material on a face opposite the anode material and a UPON barrier/electrolyte layer covering the cathode material, and the second sheet includes an anode material that includes lithium on a face opposite the cathode material and a LiPON barrier/electrolyte layer covering the anode material, and the apparatus further includes a third sheet that includes an anode material that includes lithium and a LiPON barrier/electrolyte layer covering the anode material on a first face, and an anode material that includes lithium and a LiPON barrier/electrolyte layer covering the anode material on a second face opposite the first face, and means for sandwiching a polymer electrolyte material between the LiPON barrier/electrolyte layer covering the anode material of the first sheet and the LiPON barrier/electrolyte layer covering the cathode material of the third sheet.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising: providing an anode component comprising a first sheet that includes an anode material and a first LiPON layer covering the anode material and having randomly spaced defects; providing a cathode component comprising a second sheet that includes a cathode material that includes lithium and a second LiPON layer covering the cathode material and having randomly spaced defects; and sandwiching a polymer electrolyte material between the LiPON layer covering the anode material of the first sheet and the LiPON layer covering the cathode material of the second sheet, wherein the polymer electrolyte material includes a gel and at least partially fills and fixes the randomly spaced defects in the first and second LiPON layers.

2. The method of claim 1, further comprising: providing a third sheet that includes an anode material and a third LiPON layer covering the anode material; providing a fourth sheet that includes a cathode material that includes lithium and a fourth LiPON layer covering the cathode material; sandwiching a polymer electrolyte material between the LiPON layer covering the anode material of the third sheet and the LiPON layer covering the cathode material of the fourth sheet; and sandwiching a polymer electrolyte material between the LiPON layer covering the anode material of the third sheet and the LiPON layer covering the cathode material of the second sheet.

3. The method of claim 1, wherein the anode material of the first sheet is deposited as a lithium-metal layer on a copper anode-current-collector layer through the LiPON layer.

4. The method of claim 3, wherein the deposition of a lithium anode is done by electroplating in a propylene carbonate/lithium-salt electrolyte solution prior to assembling the cell.

5. The method of claim 1, wherein the first sheet includes a cathode material on a face opposite the anode material and a LiPON layer covering the cathode material, and the second sheet includes an anode material on a face opposite the cathode material and a LiPON layer covering the anode material; the method further comprising: providing a third sheet that includes an anode material and a LiPON layer covering the anode material on a first face, and a cathode material that includes lithium and a LiPON layer covering the cathode material on a second face opposite the first face; and sandwiching the polymer electrolyte material between the LiPON layer covering the anode material of the third sheet and the UPON layer covering the cathode material of the second sheet.

6. The method of claim 1, wherein the polymer electrolyte layer includes a polyvinylidene difluoride, propylene carbonate, and a lithium salt.

7. The method of claim 1, further comprising the step of laminating two or more battery cells together to form a laminated battery device.

8. The method of claim 1, wherein the laminated battery device comprises a stack of two-sided anode current collectors and two-sided cathode current collectors that are connected in parallel.

9. The method of claim 1, wherein the laminated battery device comprises a stack of two-sided anode current collectors and two-sided cathode current collectors that are connected in series.

10. The method of claim 1, wherein the polymer electrolyte layer is an adhesive that provides a structural connection between the LiPon layers.

11. The method of claim 1, wherein the anode component comprises a current collector onto which is deposited a cathode material.

12. The method of claim 1, wherein the anode component further comprises a current collector, and wherein a layer of lithium is formed as an active portion of the cathode component after assembly of the battery cell.

13. The method of claim 1, wherein the polymer electrolyte layer is sticky.

14. The method of claim 1, wherein the polymer electrolyte layer comprises polyvinylidene difluoride, propylene carbonate, and a lithium salt.

15. The method of claim 1, wherein the polymer electrolyte layer comprises MEEP.

16. The method of claim 1, wherein the negative electrode component includes a negative-electrode current collector made of a metal that does not readily alloy with lithium during a plating operation, and lithium metal is plated onto the negative-electrode current collector through the LiPON layer on the negative electrode component.

17. The method of claim 1, wherein the polymer electrolyte layer comprises a polyphosphazene and a lithium salt.

* * * * *